(12) United States Patent
Regani et al.

(10) Patent No.: US 12,044,790 B2
(45) Date of Patent: Jul. 23, 2024

(54) METHOD, APPARATUS, AND SYSTEM FOR CORRELATION-BASED WIRELESS MONITORING AND LOCALIZATION

(71) Applicants: Sai Deepika Regani, Campbell, CA (US); Yuqian Hu, Greenbelt, MD (US); Beibei Wang, Clarksville, MD (US); K.J. Ray Liu, Potomac, MD (US); Oscar Chi-Lim Au, Rockville, MD (US)

(72) Inventors: Sai Deepika Regani, Campbell, CA (US); Yuqian Hu, Greenbelt, MD (US); Beibei Wang, Clarksville, MD (US); K.J. Ray Liu, Potomac, MD (US); Oscar Chi-Lim Au, Rockville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/211,567

(22) Filed: Jun. 19, 2023

(65) Prior Publication Data
US 2023/0333201 A1 Oct. 19, 2023

Related U.S. Application Data

(63) Continuation-in-part of application No. 18/144,092, filed on May 5, 2023, which is a continuation-in-part
(Continued)

(51) Int. Cl.
*G01S 5/02* (2010.01)

(52) U.S. Cl.
CPC .......... *G01S 5/0273* (2013.01); *G01S 5/0278* (2013.01); *G01S 2205/02* (2020.05)

(58) Field of Classification Search
CPC .......... G01S 13/56; G01S 13/86; G01S 13/88; G01S 2205/02; G01S 5/0273;
(Continued)

(56) References Cited

U.S. PATENT DOCUMENTS

| 2017/0090026 A1* | 3/2017 | Joshi | G01S 13/87 |
| 2019/0265330 A1* | 8/2019 | Rajendran | G01S 13/867 |

OTHER PUBLICATIONS

Zhou et al., "Sensorless Sensing with WiFi", Feb. 2015, School of Information Systems at Institutional Knowledge at Singapore Management University (Year: 2015).*
(Continued)

*Primary Examiner* — Zhiyu Lu

(57) ABSTRACT

Methods, apparatus and systems for correlation-based wireless monitoring are described. For example, a described method comprises: detecting and monitoring motion of a first object in a first sensing task based on a first motion information (MI) computed based on a first time series of channel information (TSCI) associated with a first device pair; detecting and monitoring motion of a second object in a second sensing task based on a second MI computed based on a second TSCI associated with a second device pair; computing a correlation score based at least partially on: the first TSCI, the second TSCI, the first MI and the second MI; detecting the first object and the second object as a same object when the correlation score is greater than a first threshold; and detecting the first object and the second object as two different objects when the correlation score is less than a second threshold.

20 Claims, 11 Drawing Sheets

Related U.S. Application Data of application No. 18/108,563, filed on Feb. 10, 2023, application No. 18/211,567 is a continuation-in-part of application No. 17/960,080, filed on Oct. 4, 2022, application No. 18/211,567 is a continuation-in-part of application No. 17/959,487, filed on Oct. 4, 2022, application No. 18/211,567 is a continuation-in-part of application No. PCT/US2022/045708, filed on Oct. 4, 2022, application No. 18/211,567 is a continuation-in-part of application No. 17/945,995, filed on Sep. 15, 2022, application No. 18/211,567 is a continuation-in-part of application No. 17/891,037, filed on Aug. 18, 2022, application No. 18/211,567 is a continuation-in-part of application No. 17/888,429, filed on Aug. 15, 2022, now Pat. No. 11,771,366, application No. 18/211,567 is a continuation-in-part of application No. 17/838,228, filed on Jun. 12, 2022, application No. 18/211,567 is a continuation-in-part of application No. 17/838,231, filed on Jun. 12, 2022, application No. 18/211,567 is a continuation-in-part of application No. 17/838,244, filed on Jun. 12, 2022, application No. 18/211,567 is a continuation-in-part of application No. 17/827,902, filed on May 30, 2022, application No. 18/211,567 is a continuation-in-part of application No. 17/539,058, filed on Nov. 30, 2021, application No. 18/211,567 is a continuation-in-part of application No. 17/537,432, filed on Nov. 29, 2021, application No. 18/211,567 is a continuation-in-part of application No. 17/352,306, filed on Jun. 20, 2021, application No. 18/211,567 is a continuation-in-part of application No. 17/352,185, filed on Jun. 18, 2021, application No. 18/211,567 is a continuation-in-part of application No. 17/180,766, filed on Feb. 20, 2021, application No. 18/211,567 is a continuation-in-part of application No. 17/149,667, filed on Jan. 14, 2021, now abandoned, application No. 18/211,567 is a continuation-in-part of application No. 17/149,625, filed on Jan. 14, 2021, application No. 18/211,567 is a continuation-in-part of application No. 17/113,023, filed on Dec. 5, 2020, now Pat. No. 11,770,197, application No. 18/211,567 is a continuation-in-part of application No. 17/019,270, filed on Sep. 13, 2020, application No. 18/211,567 is a continuation-in-part of application No. 16/909,913, filed on Jun. 23, 2020, application No. 18/211,567 is a continuation-in-part of application No. 16/871,004, filed on May 10, 2020, application No. 18/211,567 is a continuation-in-part of application No. 16/790,610, filed on Feb. 13, 2020.

(60) Provisional application No. 63/388,625, filed on Jul. 12, 2022, provisional application No. 63/354,184, filed on Jun. 21, 2022.

(58) Field of Classification Search
CPC . G01S 5/0278; H04L 27/2647; H04L 5/0026; H04L 5/0048
See application file for complete search history.

(56) References Cited

OTHER PUBLICATIONS

Adib et al., "See Through Walls with Wi-Fi!", Aug. 2013, SIGCOMM'13 (Year: 2013).*

* cited by examiner

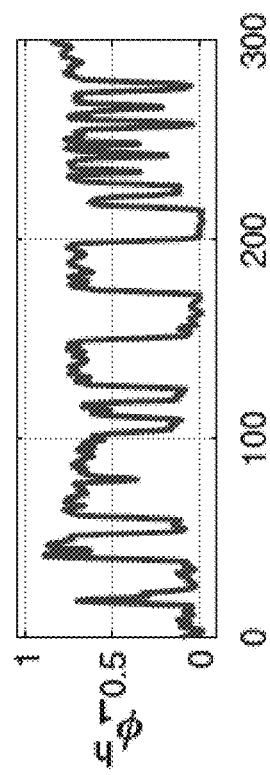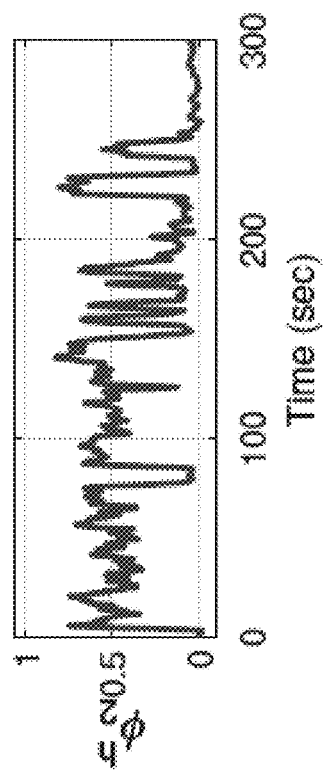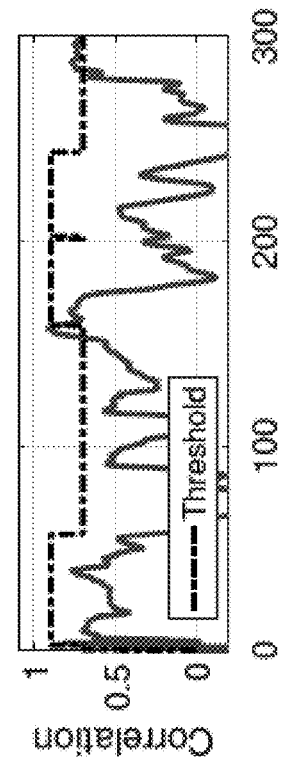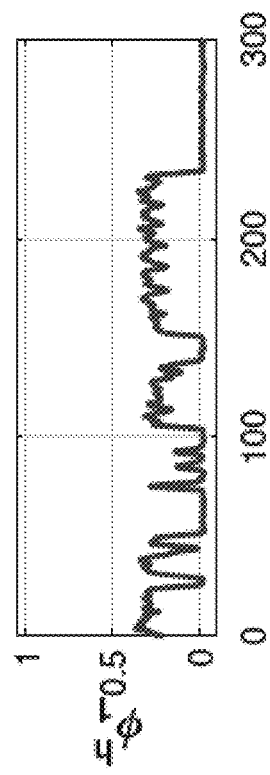
FIG. 6A
FIG. 6B
FIG. 6C
FIG. 6D

METHOD, APPARATUS, AND SYSTEM FOR CORRELATION-BASED WIRELESS MONITORING AND LOCALIZATION

CROSS-REFERENCE TO RELATED APPLICATIONS

The present application hereby incorporates by reference the entirety of the disclosures of, and claims priority to, each of the following cases:

(a) U.S. patent application Ser. No. 18/144,092, entitled "WIRELESS POSITIONING SYSTEMS", filed on May 5, 2023,
(b) U.S. patent application Ser. No. 16/790,610, entitled "METHOD, APPARATUS, AND SYSTEM FOR WIRELESS GAIT RECOGNITION", filed Feb. 13, 2020,
(c) U.S. patent application Ser. No. 16/871,004, entitled "METHOD, APPARATUS, AND SYSTEM FOR PEOPLE COUNTING AND RECOGNITION BASED ON RHYTHMIC MOTION MONITORING", filed on May 10, 2020,
(d) U.S. patent application Ser. No. 16/909,913, entitled "METHOD, APPARATUS, AND SYSTEM FOR IMPROVING TOPOLOGY OF WIRELESS SENSING SYSTEMS", filed on Jun. 23, 2020,
(e) U.S. patent application Ser. No. 17/113,023, entitled "METHOD, APPARATUS, AND SYSTEM FOR ACCURATE WIRELESS MONITORING", filed on Dec. 5, 2020,
(f) U.S. patent application Ser. No. 17/019,270, entitled "METHOD, APPARATUS, AND SYSTEM FOR VEHICLE WIRELESS MONITORING", filed on Sep. 13, 2020,
(g) U.S. patent application Ser. No. 17/149,625, entitled "METHOD, APPARATUS, AND SYSTEM FOR WIRELESS MONITORING WITH MOTION LOCALIZATION", filed on Jan. 14, 2021,
(h) U.S. patent application Ser. No. 17/149,667, entitled "METHOD, APPARATUS, AND SYSTEM FOR WIRELESS MONITORING WITH FLEXIBLE POWER SUPPLY", filed on Jan. 14, 2021,
(i) U.S. patent application Ser. No. 17/180,766, entitled "METHOD, APPARATUS, AND SYSTEM FOR WIRELESS MOTION RECOGNITION", filed on Feb. 20, 2021,
(j) U.S. patent application Ser. No. 17/352,185, entitled "METHOD, APPARATUS, AND SYSTEM FOR WIRELESS MICRO MOTION MONITORING", filed on Jun. 18, 2021,
(k) U.S. patent application Ser. No. 17/352,306, entitled "METHOD, APPARATUS, AND SYSTEM FOR WIRELESS MONITORING TO ENSURE SECURITY", filed on Jun. 20, 2021,
(l) U.S. patent application Ser. No. 17/537,432, entitled "METHOD, APPARATUS, AND SYSTEM FOR AUTOMATIC AND ADAPTIVE WIRELESS MONITORING AND TRACKING", filed on Nov. 29, 2021,
(m) U.S. patent application Ser. No. 17/539,058, entitled "METHOD, APPARATUS, AND SYSTEM FOR HUMAN IDENTIFICATION BASED ON HUMAN RADIO BIOMETRIC INFORMATION", filed on Nov. 30, 2021,
(n) U.S. patent application Ser. No. 17/827,902, entitled "METHOD, APPARATUS, AND SYSTEM FOR SPEECH ENHANCEMENT AND SEPARATION BASED ON AUDIO AND RADIO SIGNALS", filed on May 30, 2022,
(o) U.S. patent application Ser. No. 17/838,228, entitled "METHOD, APPARATUS, AND SYSTEM FOR WIRELESS SENSING BASED ON CHANNEL INFORMATION", filed on Jun. 12, 2022,
(p) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022,
(q) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022,
(r) U.S. Provisional Patent application 63/354,184, entitled "METHOD, APPARATUS, AND SYSTEM FOR MOTION LOCALIZATION AND OUTLIER REMOVAL", filed on Jun. 21, 2022,
(s) U.S. Provisional Patent application 63/388,625, entitled "METHOD, APPARATUS, AND SYSTEM FOR WIRELESS SENSING AND INDOOR LOCALIZATION", filed on Jul. 12, 2022,
(t) U.S. patent application Ser. No. 17/888,429, entitled "METHOD, APPARATUS, AND SYSTEM FOR RADIO BASED SLEEP TRACKING", filed on Aug. 15, 2022,
(u) U.S. patent application Ser. No. 17/891,037, entitled "METHOD, APPARATUS, AND SYSTEM FOR MAP RECONSTRUCTION BASED ON WIRELESS TRACKING", filed on Aug. 18, 2022.
(v) U.S. patent application Ser. No. 17/945,995, entitled "METHOD, APPARATUS, AND SYSTEM FOR WIRELESS VITAL MONITORING USING HIGH FREQUENCY SIGNALS", filed on Sep. 15, 2022,
(w) U.S. patent application Ser. No. 17/959,487, entitled "METHOD, APPARATUS, AND SYSTEM FOR VOICE ACTIVITY DETECTION BASED ON RADIO SIGNALS", filed on Oct. 4, 2022,
(x) U.S. patent application Ser. No. 17/960,080, entitled "METHOD, APPARATUS, AND SYSTEM FOR ENHANCED WIRELESS MONITORING OF VITAL SIGNS", filed on Oct. 4, 2022,
(y) PCT Patent application PCT/US22/45708, entitled "METHOD, APPARATUS, AND SYSTEM FOR WIRELESS SENSING MEASUREMENT AND REPORTING", filed on Oct. 4, 2022,
(z) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023.

TECHNICAL FIELD

The present teaching generally relates to wireless monitoring. More specifically, the present teaching relates to wireless monitoring and localization of objects in a venue based on correlation scores.

BACKGROUND

Location services and localization technologies have become indispensable daily, from map navigation to social networking. The global positioning system (GPS) has reshaped human life for several decades and is considered a crucial technological milestone in modern society. However, although GPS meets users' needs for location services in outdoor scenarios, it cannot provide reliable location data in indoor conditions due to signal blockage. Therefore, indoor localization technology is becoming a hot topic in academic research.

Indoor localization systems can be realized either actively or passively. Active indoor localization requires specialized devices attached to/carried by the human and localizes the target by continuously monitoring the signals from the devices. On the other hand, the passive indoor localization system usually relies on the perception of the sensors deployed in the environment. Therefore, it does not require the target to carry any devices. Such a design benefits multiple applications, including intruder detection, fall detection, and daily activity monitoring, where it is not possible/inconvenient to ask for the users' continuous cooperation.

Existing passive indoor localization operates in different resolutions serving different applications ranging from centimeter/decimeter level to the room-level or zone-level. While the former approaches aim to provide fine-grained indoor location information enabling applications such as indoor tracking, the latter focus on obtaining coarser location information that can provide behavior analysis and activity logs. As expected, fine-grained localization requires more hardware, complex infrastructure, calibration efforts, and user cooperation.

Commercially, room-level localization can be achieved using different approaches, which include camera-based solutions and pyroelectric infra-red (PIR) sensors, amongst others. Although the PIR sensor can responsively detect a person entering the room, it fails to detect the human continuously during low-level activities such as reading and napping, not to mention the blind spots. Cameras are widely deployed to monitor rooms for security purposes which, however, only work in line-of-sight conditions, incur additional hardware costs, and risk privacy invasion. Therefore, a robust, low-cost, and privacy-friendly solution is still highly in need.

Despite many approaches to passive indoor localization, WiFi-based approaches have gained the utmost research focus. The reason is two-fold: excellent sensing ability and negligible cost. A single WiFi access point has more coverage and fewer blind spots than other sensors, thanks to the ubiquitous indoor propagation and ability to penetrate walls. Further, the sensitivity of the WiFi multipath propagation profile to the changes in the physical environment helps to record information linked to human movement. WiFi signals can "see" multiple scales of human movement in the indoor environment, from sizeable bodily movements to chest movements. Moreover, with the channel state information (CSI) availability from commercial WiFi chipsets, these approaches incur negligible additional costs and can reuse the existing WiFi infrastructure.

Most WiFi-based localization approaches using CSI rely on dedicated deployment and calibration to infer the geometric relationships, which requires high setup effort. Other works using CSI fingerprinting need laborious training and cannot be generalized well to different environments. As a result, both these approaches are non-scalable to real-life scenarios.

SUMMARY

The present teaching relates to wireless monitoring and localization of objects in a venue based on correlation scores.

In one embodiment, a system for correlation-based wireless monitoring is described. The system comprises: at least two device pairs in a venue, each device pair comprising a first wireless device and a second wireless device, and a processor. The venue includes a number of objects each undergoing a respective motion. For each device pair, the first wireless device of the device pair is configured to transmit a respective wireless signal, and the second wireless device of the device pair is configured to: receive the respective wireless signal through a respective wireless multipath channel of the venue, wherein the received wireless signal differs from the transmitted wireless signal due to the respective wireless multipath channel and motions of a number of objects in the venue, obtain a respective time series of channel information (TSCI) of the respective wireless multipath channel based on the received wireless signal, compute a respective motion information (MI) based on the TSCI, and perform a respective sensing task based on the respective MI and the respective TSCI. The processor is configured for: computing a correlation score based at least partially on: a first TSCI, a second TSCI, a first MI and a second MI, wherein motion of a first object is detected and monitored in a first sensing task based on the first MI computed based on the first TSCI associated with a first device pair, wherein motion of a second object is detected and monitored in a second sensing task based on the second MI computed based on the second TSCI associated with a second device pair; detecting the first object and the second object as a same object when the correlation score is greater than a first threshold; and detecting the first object and the second object as two different objects when the correlation score is less than a second threshold.

In another embodiment, a method for correlation-based wireless monitoring is described. The method comprises: forming, by a plurality of first wireless devices and a plurality of second wireless devices in a venue, at least two device pairs, each device pair comprising a first wireless device and a second wireless device, wherein the venue includes a number of objects each undergoing a respective motion; for each device pair: transmitting, by the first wireless device of the device pair, a respective wireless signal, receiving, by the second wireless device of the device pair, the respective wireless signal through a respective wireless multipath channel of the venue, wherein the received wireless signal differs from the transmitted wireless signal due to the respective wireless multipath channel and the motions of the number of objects in the venue, obtaining a respective time series of channel information (TSCI) of the respective wireless multipath channel based on the received wireless signal, computing a respective motion information (MI) based on the TSCI, and performing a respective sensing task based on the respective MI and the respective TSCI; detecting and monitoring motion of a first object in a first sensing task based on a first MI computed based on a first TSCI associated with a first device pair; detecting and monitoring motion of a second object in a second sensing task based on a second MI computed based on a second TSCI associated with a second device pair; computing a correlation score based at least partially on: the first TSCI, the second TSCI, the first MI and the second MI; detecting the first object and the second object as a same object when the correlation score is greater than a first threshold; and detecting the first object and the second object as two different objects when the correlation score is less than a second threshold.

In yet another embodiment, apparatus for correlation-based wireless monitoring is described. The apparatus comprises: a memory having a set of instructions stored therein; and a processor communicatively coupled with the memory. The processor is configured for: computing a correlation score based at least partially on: a first time series of channel information (TSCI), a second TSCI, a first motion information (MI) and a second MI. Motion of a first object is detected and monitored in a first sensing task associated with a first device pair based on the first MI computed based on the first TSCI obtained from a first wireless signal communicated between the first device pair in a venue, wherein the venue includes a number of objects each undergoing a respective motion. Motion of a second object is detected and monitored in a second sensing task associated with a second device pair based on the second MI computed based on the second TSCI obtained from a second wireless signal communicated between the second device pair in the venue, wherein each device pair comprises a first wireless device and a second wireless device. For each device pair: the first wireless device of the device pair is configured to transmit a respective wireless signal, and the second wireless device of the device pair is configured to: receive the respective wireless signal through a respective wireless multipath channel of the venue, wherein the received wireless signal differs from the transmitted wireless signal due to the respective wireless multipath channel and the motions of the number of objects in the venue, obtain a respective TSCI of the respective wireless multipath channel based on the received wireless signal, compute a respective MI based on the TSCI, and perform a respective sensing task based on the respective MI and the respective TSCI. The processor is further configured for: detecting the first object and the second object as a same object when the correlation score is greater than a first threshold, and detecting the first object and the second object as two different objects when the correlation score is less than a second threshold.

Other concepts relate to software for implementing the present teaching on wireless monitoring and localization of objects in a venue based on correlation scores. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIGS. 6A-6D show exemplary motion statistics from receivers and a correlation threshold in various scenarios for wireless monitoring, according to some embodiments of the present disclosure.

DETAILED DESCRIPTION

Figure 1A:
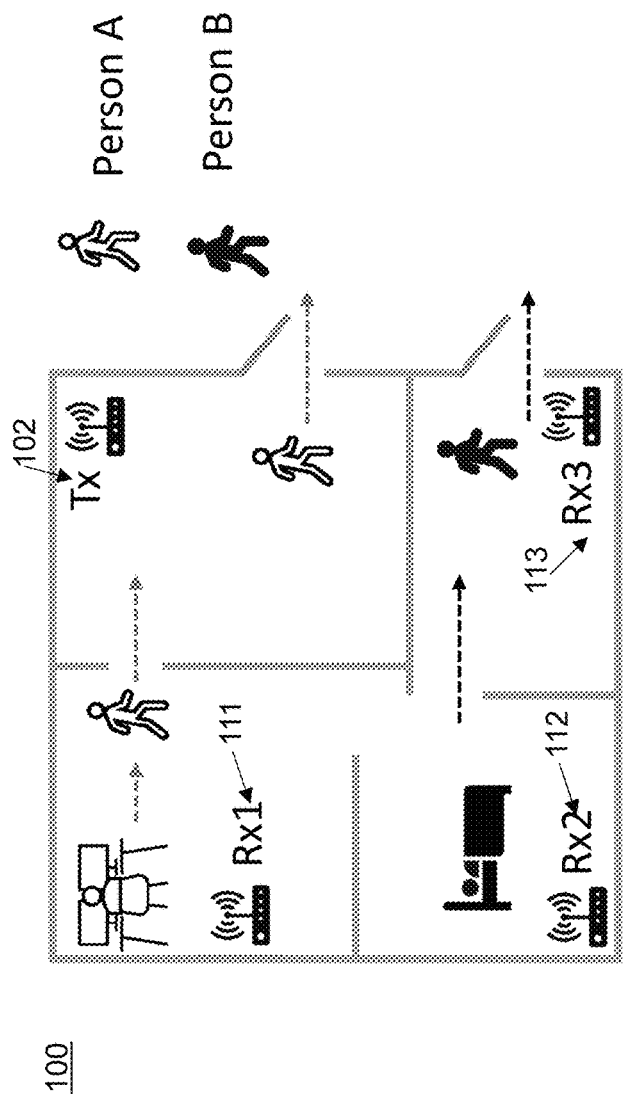
FIG. 1A shows an exemplary environment for motion monitoring and localization, according to some embodiments of the present disclosure.

The symbol "I" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behaviod/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/ reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowledgement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type 1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type 1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless-enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type 1 (or Type2) devices.

Type1/Type2 devices may/may not be authenticated/associated/collocated. They may be same device. Type 1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type 1 device without establishing connection (e.g. association/authentication/handshake) with, or requesting service from, Type1 device. Type 1/Type2 device may move with object/another object to be tracked.

Type 1 (TX) device may function as Type2 (RX) device temporarily/sporadically/continuously/repeatedly/interchangeably/alternately/simultaneously/contemporaneously/concurrently; and vice versa. Type 1 device may be Type2 device. A device may function as Type 1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type 1/Type2 device moving with object (e.g. wearable devices/automated guided vehicle/AGV), or passively with Type 1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/ daily/simplified/detailed/cross-sectional/small/large/form-factor/color-coded/comparative/summary/web view, animation/voice announcement/another presentation related to periodic/repetition characteristics of repeating motion/expression.

Multiple Type 1 (or Type 2) devices may interact with a Type2 (or Type 1) device. The multiple Type 1 (or Type2) devices may be synchronized/asynchronous, and/or may use same/different channels/sensing parameters/settings (e.g. sounding frequency/bandwidth/antennas). Type2 device may receive another signal from Type 1/another Type 1 device. Type 1 device may transmit another signal to Type2/another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type 1) device to another Type2 (or another Type 1) device. The switching may be controlled by server/hub device/processor/Type 1 device/Type2 device. Radio channel may be different before/after switching. A second wireless signal may be transmitted between Type1 (or Type2) device and second Type2 (or second Type1) device through the second channel A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified over time (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type 1 device and nearby/portable/another device may be established (e.g. using signal handshake). Type 1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type 1 device, triggering Type 1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type 1 device. Nearby/portable/another device may be a dummy device with purpose (e.g. primary purpose, secondary purpose) to establish wireless connection with Type 1 device, to receive first signal, or send second signal. Nearby/portable/another device may be physically attached to Type 1 device.

In another example, nearby/portable/another device may send third handshake signal to Type 1 device triggering Type 1 device to broadcast signal to multiple Type2 devices without establishing connection with them. Type 1 device may reply to third signal by transmitting fourth handshake signal to the another device.

Nearby/portable/another device may be used to trigger multiple Type 1 devices to broadcast. It may have multiple RF circuitries to trigger multiple transmitters in parallel. Triggering may be sequential/partially sequential/partially/fully parallel. Parallel triggering may be achieved using additional device (s) to perform similar triggering in parallel to nearby/portable/another device. After establishing connection with Type 1 device, nearby/portable/another device may suspend/stop communication with Type 1 device. It may enter an inactive/hibernation/sleep/stand-by/low-power/OFF/power-down mode. Suspended communication may be resumed. Nearby/portable/another device may have the particular MAC address and Type 1 device may send signal to particular MAC address.

The (first) wireless signal may be transmitted by a first antenna of Type 1 device to some first Type2 device through a first channel in a first venue. A second wireless signal may be transmitted by a second antenna of Type 1 device to some second Type2 device through a second channel in a second venue. First/second signals may be transmitted at first/second (sounding) rates respectively, perhaps to first/second MAC addresses respectively. Some first/second channels/signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e g channels/signals/rates/MAC addresses/antennas/Type 1/Type2 devices) may be changed/adjusted/varied/modified over time (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferiodunsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type 1/Type2 device become progressively far away, or when channel becomes congested.

Some settings (e.g. Type 1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/pre Bence/movement/daily/activity/history/event.

Classifier may comprise linear/nonlinear/binary/multi-class/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/ profile/events/tendency/inclination/behavior, cause-and-effect/short-term/long-term/correlation/statistics/frequency/ period/duration, motion/movement/location/map/ coordinate/height/speed/acceleration/angle/rotation/size/ volume, suspicious/dangerous/alarming event/warning/ belief/proximity/collision, tracking/breathing/heartbeat/gait/ action/event/statistical/hourly/daily/weekly/monthly/yearly parameters/statistics/analytics, well-being/health/disease/ medical statistics/analytics, an early/instantaneous/contemporaneous/delayed indication/suggestion/sign/indicator/ verifier/detection/symptom of a state/condition/situation/ disease/biometric, baby/patient/machine/device/ temperature/vehicle/parking lot/venue/lift/elevator/spatial/ road/fluid flow/home/room/office/house/building/ warehouse/storage/system/ventilation/fan/pipe/duct/people/ human/car/boat/truck/airplane/drone/downtown/crowd/ impulsive event/cyclo-stationary/environment/vibration/ material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/ Monte Carlo computation.

A current event/motion/expression/object in venue at current time may be classified by applying classifier to current TSCI/characteristics/STI/MI obtained from current wireless signal received by Type2 device in venue from Type 1 devices in an operating stage. If there are multiple Type 1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/ characteristics/STI/MI may be augmented by training TSCI/ characteristics/STI/MI (or fragment/extract) to bootstrap classification/classifier.

A first section/segment (with first duration/starting/ending time) of a first TSCI (associated with first Type 1-Type2 device pair) may be aligned (e.g. using dynamic time warping/DTW/matched filtering, perhaps based on some mismatch/distance/similarity score/cost, or correlation/auto-correlation/cross-correlation) with a second section/segment (with second duration/starting/ending time) of a second TSCI (associated with second Type 1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/ weighted sum, weighted average/robust/trimmed mean/ arithmetic/geometric/harmonic mean, median/mode. Link-wise similarity score may be computed between first/second items associated with a link (TX-RX antenna pair) of first/second Type 1-Type2 device pairs (e.g. based on aggregate of corresponding item-wise similarity scores). Segment-wise similarity score may be computed between first/ second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/ reference", first/second TSCI may be two TSCI obtained during training stage (e.g. for two training events/states/ classes). For "current/current", first/second TSCI may be two TSCI obtained during operating stage (e.g. associated with two different antennas, or two measurement setups). In another example, first/second Type 1-Type2 device pairs may be different, but share a common device (Type 1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/ another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/ tentative classification results (e.g. associate if similarity scores prevail (e.g. being max/min/dominant/matchless/ most significant/excel) or significant enough (e.g. higher/ lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/ IQ-compensation settings, environment effect on wireless signal propagation, channel input-to-output transformation, stable behavior of environment, state profile, wireless channel measurements/received signal strength indicator (RSSI)/ channel state information (CSI)/channel impulse response (CIR)/channel frequency response (CFR)/characteristics of frequency components (e.g. subcarriers)/channel characteristics/channel filter response, auxiliary information, data/ meta/user/account/access/security/session/status/supervisory/device/network/household/neighborhood/environment/ real-time/sensor/stored/encrypted/compressed/protected data, identity/identifier/identification.

Each CI may be associated with timestamp/arrival time/ frequency band/signature/phase/amplitude/trend/characteristics, frequency-like characteristics, time/frequency/time-frequency domain element, orthogonal/non-orthogonal decomposition characteristics of signal through channel Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type 1 device with M antennas and Type2 device with N antennas, there may be MN link-wise TSCI.

CI/TSCI may be preprocessed/processed/postprocessed/ stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/ LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/ phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/ short-/long-term/historical/repetitive/repeated/repeatable/ recurring/periodic/pseudoperiodic/regular/habitual/incremental/average/initial/final/current/past/future/predicted/ changing/deviational/change/time/frequency/orthogonal/ non-orthogonal/transform/decomposition/deterministic/ stochastic/probabilistic/dominant/key/prominent/ representative/characteristic/significant/insignificant/ indicative/common/averaged/shared/typical/prototypical/ persistent/abnormal/a brupt/impulsive/sudden/unusual/unrepresentative/atypical/suspicious/dangerous/alarming/ evolving/transient/one-time quantity/characteristics/ analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/ navigation/tracking, linear/rotational/horizontal/vertical/ location/distance/displacement/height/speed/velocity/ acceleration/change/angular speed, direction/orientation, size/length/width/height/azimuth/area/volume/capacity, deformation/transformation, object/motion direction/angle/ shape/form/shrinking/expanding, behavior/activity/movement, occurrence, fall-down/accident/security/event, period/ frequency/rate/cycle/rhythm/count/quantity, timing/ duration/interval, starting/initiating/ending/current/past/next time/quantity/information, type/grouping/classification/ composition, presence/absence/proximity/approaching/receding/entrance/exit, identity/identifier, head/mouth/eye/ breathing/heart/hand/handwriting/arm/body/gesture/leg/ gait/organ characteristics, tidal volume/depth of breath/ airflow rate/inhale/exhale time/ratio, gait/walking/tool/ machine/complex motion, signal/motion characteristic/ information/feature/statistics/parameter/magnitude/phase/ degree/dynamics/anomaly/variability/detection/estimation/ recognition/identification/indication, slope/derivative/ higher order derivative of function/feature/mapping/ transformation of another characteristics, mismatch/ distance/similarity score/cost/metric, Euclidean/statistical/ weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/ similarity scores/test quantities. Static (or dynamic) segment/profile may be identified/computed/analyzed/monitored/extracted/obtained/marked/presented/indicated/ highlighted/stored/communicated by analyzing CI/TSCI/ features/functions of features/test quantities/characteristics/ STI/MI (e.g. target motion/movement presence/detection/ estimation/recognition/identification). Test quantities may be based on CI/TSCI/features/functions of features/characteristics/STI/MI. Test quantities may be processed/tested/ analyzed/compared.

Test quantity may comprise any/any function of: data/ vector/matrix/structure, characteristics/STI/MI, CI information (CII, e.g. CI/CIC/feature/magnitude/phase), directional information (DI, e.g. directional CII), dominant/representative/characteristic/indicative/key/archetypal/exemplary/ paradigmatic/prominent/common/shared/typical/prototypical/averaged/regular/persistent/usual/normal/atypical/ unusual/abnormal/unrepresentative data/vector/matrix/ structure, similarity/mismatch/distance score/cost/metric, auto/cross correlation/covariance, sum/mean/average/ weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chaidair-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type 1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighting/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/display/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mirror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boativessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/ fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalatodelevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life-threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/response/presentation/experience/media/multimedia/expression/sound/speech/musicmage/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/doodwindow/garage/lift/elevatodescalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/command/instruction/question/quer y/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activ at e/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/ channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/ field/voice/music/song/dialog system, using visual tool such as TV/entertainment system/computer/notebook/tablet/display/light/color/brightness/patterns symbols, using haptic/ virtual reality/gesture/tool, using smart device/appliance/ material/furniture/fixture, using server/hub device/cloud/ fog/edge server/home/mesh network, using messaging/ notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from nighttime to day-time profile, turn on bedroom light, turn on restroom light as user approaches restroom, check radio/ streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/ close garage door, turn on/off garage/driveway light, close/ lock all windows/doors (if user forgets), turn off appliance (e.g. stove/microwave/oven), turn on/arm security system, adjust light/air-conditioning/heating/ventilation systems to "away" profile to save energy, and/or send alerts/reports/ updates to user's smart phone.

Motion may comprise any of: no-motion, motion sequence, resting/non-moving motion, movement/change in position/location, daily/weekly/monthly/yearly/repeating/ activity/behavior/action/routine, transient/time-varying/fall-down/repeating/repetitive/periodic/pseudo-periodic motion/ breathing/heartbeat, deterministic/non-deterministic/ probabilistic/chaotic/random motion, complex/combination motion, non-/pseudo-/cyclo-/stationary random motion, change in electro-magnetic characteristics, human/animal/ plant/body/machine/mechanical/vehicle/drone motion, air-/ wind-/weather-/water-/fluid-/ground/sub-surface/seismic motion, man-machine interaction, normal/abnormal/dangerous/warning/suspicious motion, imminent/rain/fire/flood/ tsunami/explosion/collision, head/facial/eye/mouth/tongue/ neck/finger/hand/arm/shoulder/upper/lower/body/chest/ abdominal/hip/leg/foot/joint/knee/elbow/skin/below-skin/ subcutaneous tissue/blood vessel/intravenous/organ/heart/ lung/stomach/intestine/bowel/eating/breathing/talking/ singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/ or 2.4/3.65/4.9/5/6/sub-7/over-7/28/60/76 GHz/another radio. Heterogeneous IC may comprise processor/memory/ software/firmware/instructions. It may support broadband/ wireless/mobile/mesh/cellular network, WLAN/WAN/ MAN, standard/IEEE/3GPP/WiFi/4G/LTE/5G/6G/7G/8G, IEEE 802.11/a/b/g/n/ac/ad/af/ah/ax/ay/az/be/bf/15/16, and/ or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/ GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/ optical/organic/storage system/network, network/cloud/ edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/ multi-link/component/item/quantity, magnitude/norm/ phase/feature/energy/timebase/similarity/distance/ characterization score/measure computation/extraction/ correction/cleaning, linear/nonlinear/FIR/IIR/MA/AR/ ARMA/Kalman/particle filtering, lowpass/bandpass/ highpass/median/rank/quartile/percentile/mode/selective/ adaptive filtering, interpolation/intrapolation/extrapolation/ decimation/subsampling/upsampling/resampling, matched filtering/enhancement/restoration/denoising/smoothing/ conditioning/spectral analysis/mean subtraction/removal, linear/nonlinear/inverse/frequency/time transform, Fourier transform (FT)/DTFT/DFT/FFT/wavelet/Laplace/Hilbert/ Hadamard/trigonometric/sine/cosine/DCT/power-of-2/ sparse/fast/frequency transform, zero/cyclic/padding, graph-based transform/processing, decomposition/orthogonal/non-orthogonal/over-complete projection/eigen-decomposition/ SVD/PCA/ICA/compressive sensing, grouping/folding/ sorting/comparison/soft/hard/thresholding/clipping, first/ second/high order derivative/integration/convolution/ multiplication/division/addition/subtraction, local/global/ maximization/minimization, recursive/iterative/constrained/ batch processing, least mean square/absolute error/ deviation, cost function optimization, neural network/ detection/recognition/classification/identification/ estimation/labeling/association/tagging/mapping/ remapping/training/clustering/machine/supervised/ unsupervised/semi-supervised learning/network, vector/ quantization/encryption/compression/matching pursuit/ scrambling/coding/storing/retrieving/transmitting/ receiving/time-domain/frequency-domain/normalization/ scaling/expansion/representing/merging/combining/ splitting/tracking/monitoring/shape/silhouette/motion/ activity/analysis, pdf/histogram estimation/importance/ Monte Carlo sampling, error detection/protection/ correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/ union/intersection, vector operation/addition/subtraction/ multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/ piecewise linear/real/complex/vector-valued/inverse/ absolute/indicator/limiting/floodrounding/sign/composite/ sliding/moving function, derivative/integration, function of function, one-to-one/one-to-many/many-to-one/many-to-many function, mean/mode/median/percentile/max/min/ range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/ clipping/rounding/truncation/quantization/approximation, time function processed with an operation (e.g. filtering), sine/cosine/tangent/cotangent/secant/cosecant/elliptical/ parabolic/hyperbolic/game/zeta function, probabilistic/stochastic/random/ergodic/stationary/deterministic/periodic/ repeated function, inverse/transformation/frequency/ discrete time/Laplace/Hilbert/sine/cosine/triangular/ wavelet/integer/power-of-2/sparse transform, orthogonal/ non-orthogonal/eigen projection/decomposition/eigenvalue/ singular value/PCA/ICA/SVD/compressive sensing, neural network, feature extraction, function of moving window of neighboring items of time series, filtering function/convolution, short-time/discrete transform/Fourier/cosine/sine/ Hadamard/wavelet/sparse transform, matching pursuit, approximation, graph-based processing/transform/graph signal processing, classification/identification/class/group/ category/labeling, processing/preprocessing/postprocessing, machine/learning/detection/estimation/feature extraction/ learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/ zero crossing/smoothing, up/down/random/importance/ Monte Carlo sampling/resampling/converting, interpolation/extrapolation, short/long term statistics/auto/ cross correlation/moment generating function/time averaging/weighted averaging, special/Bessel/Beta/Gamma/ Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/ choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/ negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/ dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/ covariance, inner product of two vectors, L1/L2/Lk/Euclidean/statistical/weighted/distance score/norm/metric/quality metric, signal quality condition, statistical characteristics, discrimination score, neural network/deep learning network/ machine learning/training/discrimination/weighted averaging/preprocessing/denoising/signal conditioning/filtering/ time correction/timing compensation/phase offset compensation/transformation/component-wise operation/ feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/ link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type 1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/history/user/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/doodwindow/open/close/fall-down/accident/burning/freezing/water-/wind-/air-movement event, repeated/pseudo-periodic event (e g running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type 1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type 1 devices) in second floor to monitor bedrooms in second floor. Once again, he finds that system set up is extremely easy as he simply needs to plug Type2 device and Type 1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type 1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/doodwindow/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

Achieving indoor localization enables several intelligent and smart home applications, such as monitoring overall activities of daily living (ADL), smart lighting/temperature control, and triggering location-specific IoT devices. In addition, ADL information further facilitates physical and mental health monitoring and extracting valuable activity insights. WiFi-based solutions to this problem are widely appreciated due to their ubiquity and privacy protection. Current WiFi-based localization approaches either focus on fine-grained target localization demanding high calibration efforts or cannot localize multiple people at the coarser level, making them unfit for robust ADL applications. The present teaching discloses a robust WiFi-based room/zone-level localization solution that is calibration-free, device-free (passive), and built with commercial WiFi chipsets. A disclosed system can extract features, e.g. multi-modal information from WiFi Channel State Information (CSI), indicative of the motion and breathing patterns, thus detecting and localizing a person, pet or object even when there is only subtle physical movement, overcoming the drawbacks of several existing solutions such as the PIR.

In some embodiments, the extracted features from the CSI are compared from multiple receivers to pinpoint the receiver closest to the movement. Understanding the location of the WiFi receivers fixed in a venue can help to localize the movement. A disclosed system can also incorporate the challenging cases of localizing multiple people simultaneously at multiple locations. Furthermore, a disclosed system may use a correlation between the movement patterns, e.g. estimating the number of people in the environment using the correlation between movement patterns, to break ambiguous location scenarios. The disclosed systems can achieve a high average detection rate including different activity levels, and a high localization accuracy based on experiments performed across different environments.

One goal of the present teaching is to build a robust system to extract and log the daily living activities and to focus on coarse positioning, i.e., room-level/"zone-level". In some embodiments, a disclosed system uses a passive design to constantly localize the indoor movement of humans, and can localize and monitor the daily human activities based on multimodal information from WiFi with zero training efforts.

First, a robust presence detection approach is needed to localize a person. Presence detection has been studied in the past by capturing the temporal variations caused by the moving object. For this, time-domain features such as the CSI amplitude, the variance distribution of CSI amplitude, the variance of amplitude variance over subcarriers, eigenvalues of CSI amplitude and phase features are leveraged. In addition, periodic changes in the CSI induced by the human breathing patterns are also used to detect a stationary human. A disclosed system can identify human movements by extracting the first tap of the auto-correlation function (ACF) of the CSI, and further enhance the weak motion signal using maximum ratio combining (MRC). The latter features are robust against environment dependencies and provide insights into the extent of physical motion and the detection, adding more value to the ADL application.

Achieving robust indoor localization with WiFi poses several challenges/questions that will be addressed, including extracting the dynamic signal when the person has little to no physical movement, localizing multiple people simultaneously at multiple locations, making the system robust to location and environment changes.

Human presence is determined by analyzing the changes in the CSI caused by dynamic human-affected multipath. Higher the intensity of motion and proximity to the transceivers, more multipath are affected, resulting in detection with higher confidence. The issue arises when he/she has little to no physical motion in scenarios such as reading a book or sleeping. To identify small movements, a disclosed system may compute the autocorrelation of CSI and analyze changes up to a time lag of several seconds. The extended search window over the time lag enables the system to extract the accumulated changes over the previous few seconds, otherwise not evident from the current CSI. When there are no bodily movements, human breathing induces periodic changes to the indoor multipath, seen as peaks in the ACF.

Multiple people localization has been a challenging task given the complicated interaction of multipath and the low resolution of WiFi. The multiple receiver setups handle part of the problem. With different people in different rooms having a receiver (Rx), each can see the changes induced to the CSI by respective human motion. Separated motion detection for each Rx can thus determine the locations at which people are moving/present. However, one person could be present in a location that affects much multipath received by multiple receivers. If different Rx performs separate motion detection, this scenario is interpreted as multiple users present at multiple Rx locations. Identifying the number of independent motion sources in the environment thus becomes necessary. When the source of motion is the same, the trend of the motion intensities seen by multiple Rx will be the same, which can be determined by the correlation of the motion features.

In some embodiments, a disclosed system does not rely on any location-specific fingerprints. Instead, the disclosed system can extract the degree of changes induced by human motion in the CSI at each Rx and use the relative strength and patterns to estimate the probability and number of active locations. The system aims to predict the Rx, which is closest to the source of motion, rather than providing the exact location of the user, which makes it robust to location and environment changes.

As explained above, the disclosed system can achieve robust indoor localization without training and calibration. It addresses the major challenges faced by the existing WiFi-based indoor localization works. The disclosed system provides a novel and complete pipeline for a WiFi-based whole-home ADL localization using a multiple receiver setting. Moreover, unlike most existing works, the disclosed system does not require re-calibration when transferred to a new environment and is training-free. The disclosed system can estimate the user's location even if he/she has very low (reading a book, watching TV) to no motion (sleeping, meditating). The disclosed system may include a micro-motion enhancer module that amplifies even subtle bodily movements enabling localization. The disclosed system can address the issue of multiple active locations/multiple people localization. To remove location ambiguities from involving multiple people, the disclosed system can estimate the number of people/sources of motion in the environment.

Figure 1B:
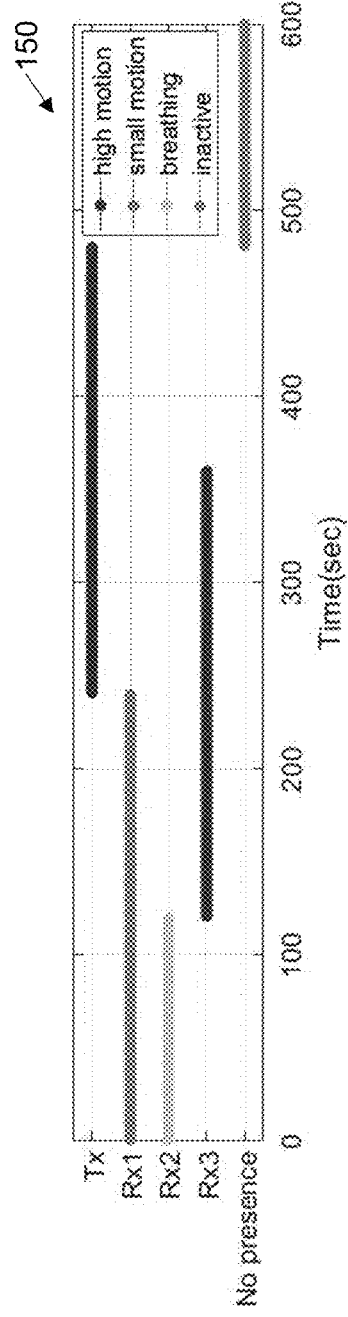
FIG. 1B shows different activities extracted by a wireless system, according to some embodiments of the present disclosure.

FIG. 1A shows an exemplary environment 100 for motion monitoring and localization, according to some embodiments of the present disclosure. In the environment 100, two people, persons A and B, move across rooms with time and perform different activities simultaneously and leave the venue one after other. While a transmitter (Tx) 102 is placed in one room, three different receivers, Rx1 111, Rx2 112, Rx3 113, are placed in three other rooms respectively. Each of the receivers can receive a wireless signal transmitted by the Tx 102, via a multipath channel. The wireless signal is impacted by motions of person A and person B, while the persons are in any room of the venue. A disclosed system can compute CSI time series based on the received wireless signals, and extract different features from the CSI time series. The activity logs of the two persons can be extracted by the disclosed system based on the different features extracted from the CSI time series, as shown in chart 150 in FIG. 1B and Table I below.

TABLE I

| Time | 0-2 min | 2-4 min | 4-6 min | 6-8 min | 8-10 min |
|---|---|---|---|---|---|
| Person A | Person A | Rx1 | Rx1 | Tx | Tx | Outside |
| Person B | Person B | Rx2 | Rx3 | Rx3 | Outside | Outside |

Figure 2A:
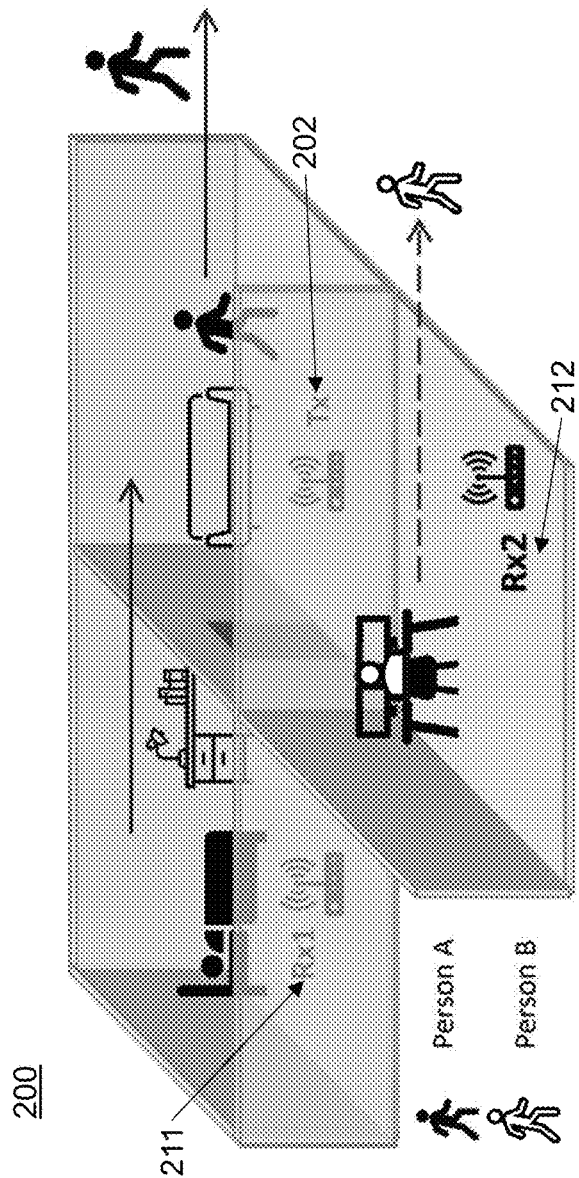
FIG. 2A shows an exemplary another environment for motion monitoring and localization, according to some embodiments of the present disclosure.
Figure 2B:
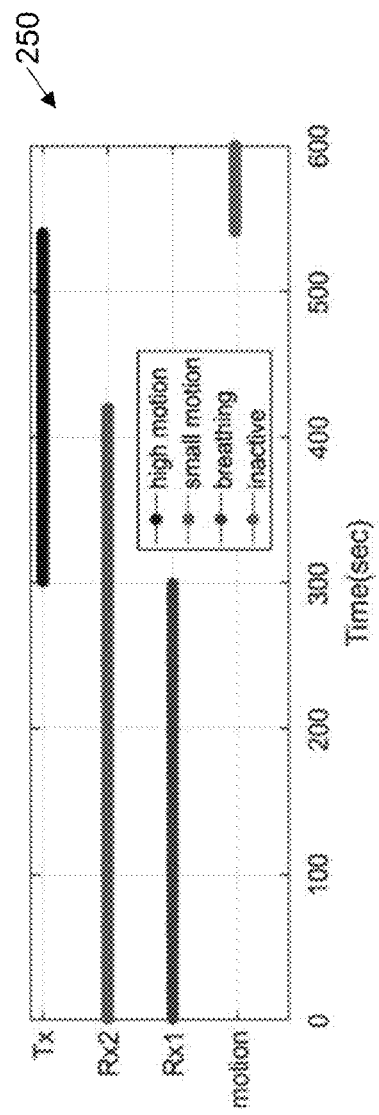
FIG. 2B shows different activities extracted by another wireless system, according to some embodiments of the present disclosure.

FIG. 2A shows an exemplary another environment 200 for motion monitoring and localization, according to some embodiments of the present disclosure. In the environment 200, two people, persons A and B, move across rooms with time and perform different activities simultaneously and leave the venue one after other. While a transmitter Tx 202 is placed in one room, two different receivers, Rx1 211, Rx2 212, are placed in two other rooms respectively. Each of the receivers can receive a wireless signal transmitted by the Tx 202, via a multipath channel. The wireless signal is impacted by motions of person A and person B, while the persons are in any room of the venue. A disclosed system can compute CSI time series based on the received wireless signals, and extract different features from the CSI time series. The activity logs of the two persons can be extracted by the disclosed system based on the different features extracted from the CSI time series, as shown in chart 250 in FIG. 2B and Table II below. In various embodiments, the number of transmitters and the number of receivers can be changed to form multiple device pairs, each having a respective transmitter and a respective receiver.

TABLE II

| Time | Person A | Person B |
|---|---|---|
| 0-5 min | Rx1 | Rx2 |
| 5-7 min | Tx | Rx2 |
| 7-9 min | Tx | Outside |
| 9-10 min | Outside | Outside |

In some embodiments, a disclosed system utilizes the CSI time series from the commercial WiFi chipsets for localization. CSI characterizes the WiFi signal propagation from the Tx to the Rx and profiles a specific state of the wireless multipath environment. The system can leverage the statistical characteristics of the CSI and perform localization by continuously capturing and monitoring the CSI from commercial WiFi chipsets.

Based on the superposition properties of the electromagnetic fields, the received CSI over frequency f at time t can be decomposed into a static part and a dynamic part, as $$H(t,f) = H_s(t,f) + \Sigma_{i \in \Omega_d(t)} H_i(t,f). \tag{1}$$

The static part is contributed by the reflections by the stationary objects while the dynamic part is contributed by the set of moving scatterers $\Omega_d(t)$. Since raw CSI suffers from synchronization errors and phase distortions, the system may only exploit the power response of CSI measurement, defined as $$G(t,f) \triangleq |H(t,f)|^2 = \xi(t,f) + n(t,f), \tag{2}$$

where $\xi(t, f)$ denotes the power of the transmitted signals and $n(t,f)$ is the additive white noise. $\xi(t,f)$ and $n(t,f)$ are independent of each other as they are contributed by independent sources.

Figure 3:
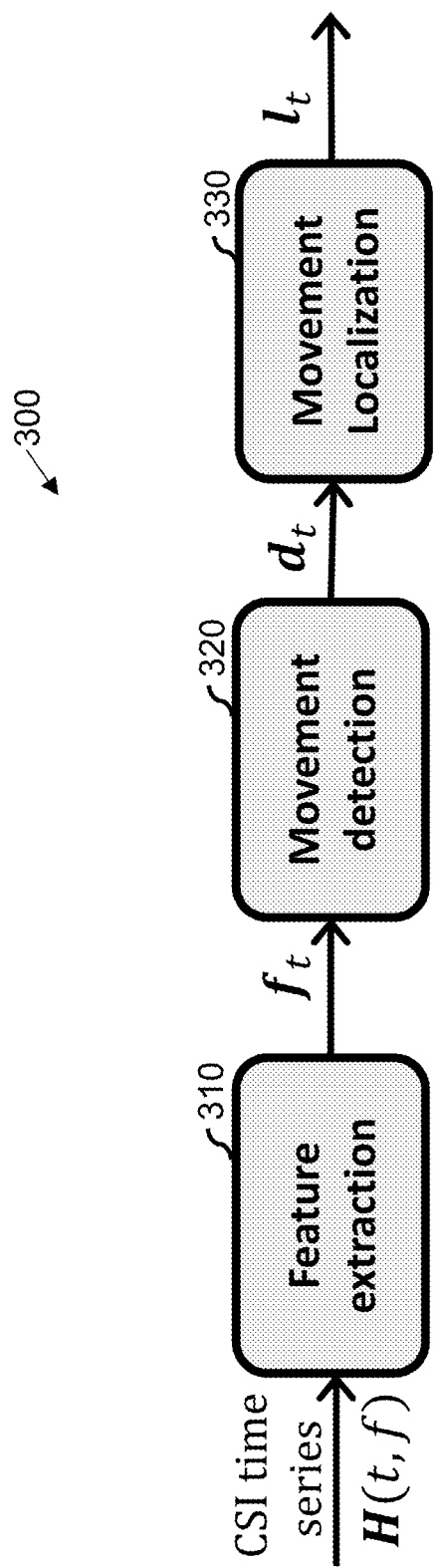
FIG. 3 shows an exemplary diagram of a wireless system for motion monitoring and localization, according to some embodiments of the present disclosure.

From the power response G(t,f), the system may extract different features that can detect and localize movements in an indoor environment. In some embodiments, the disclosed system comprises three modules: feature extraction, movement detection, and movement localization. FIG. 3 shows an exemplary diagram of a wireless system 300 for motion monitoring and localization, according to some embodiments of the present disclosure. As shown in FIG. 3, the wireless system 300 includes a feature extraction module 310 configured to extract features f_t based on CSI time series obtained from wireless signals; a movement detection module 320 configured to detect motions, e.g. by generating motion information d_t based on the extracted features; and a movement localization module 330 configured to determine locations for detected motions, e.g. by generating locations information l_t based on some correlation scores. Each of these modules will be discussed in detail below.

Feature Extraction

Human indoor activities can be either dynamic or quasi-static. Dynamic activities include large body level motion such as walking, sitting down and exercising. Quasi-static movements include activities such as reading and sleeping, during which the intensity of movement is light, thereby creating much lesser disturbance to the wireless multipath propagation. For subtle motion, although the instantaneous movement is negligible, the changes to the multipath propagation are accumulated over time, thus allowing for movement detection when observing the changes over a time window spanning few seconds. However, when a person is sleeping/meditating, the dynamic signal could be very weak. In such cases, the system can leverage the periodic nature of the chest movement during breathing which can be extracted using signal processing techniques. Based on these observations, one can derive three CSI-based features from Auto-Correlation Function (ACF) of CSI power response to detect the dynamic status and the quasi-static status. The ACF can be derived as:

$$\rho_G(\tau, f) = \frac{\sigma_\xi^2(f)}{\sigma_\xi^2(f) + \sigma_n^2(f)} \rho_\xi(\tau, f) + \frac{\sigma_n^2(f)}{\sigma_\xi^2(f) + \sigma_n^2(f)} \delta(\tau), \tag{3}$$

where $\tau$ is the time lag of the ACF, $\sigma_\xi^2(f)$ and $\sigma_n^2(f)$ are the variances of $\xi(t,f)$ and $n(t, f)$, respectively, $\rho_\xi(\tau, f)$ and Dirac delta function $\delta_{(\tau)}$ are the ACFs of $\xi(t, f)$ and $n(t, f)$.

To detect the high motion, like people's walking, running, the system can use motion statistics defined as $\lim_{\tau \to 0} \rho_G(\tau, f)$. More specifically, in Equ. (3), as $\tau \to 0$, one can have $\delta_{(\tau)} = 0$ due to the whiteness of the additive noise. If motion is present in the propagation coverage of the WiFi devices, the multipath propagation is disturbed and the signal variance $\sigma_\xi^2(f) > 0$. Since $\lim_{\tau \to 0} \rho_G(\tau, f) = 1$ due to the continuity of motion, the limit of $\rho_G(\tau, f)$ will be a positive value, i.e., $\lim_{\tau \to 0} \rho_G(\tau, f) > 0$. If there is no motion, the environment is static and the variance $\sigma_\xi^2(f) = 0$, which suggests that $\lim_{\tau \to 0} \rho_G(\tau, f) = 0$. Therefore, $\lim_{\tau \to 0} \rho_G(\tau, f)$ is a good indicator of the presence of motion. In practice, a system can use the first lag of ACF of CSI power response to approximate $\lim_{\tau \to 0} \rho_G(\tau, f)$ due to the finite sampling rate and define the high motion feature as $$\phi^h \triangleq \frac{1}{K} \sum_{k=1}^{K} \rho_G\left(\tau = \frac{1}{F_s}, f_k\right), \tag{4}$$

where $F_s$ is the sampling rate and $f_k$ is the frequency at k-th subcarrier. As Equ. (4) illustrates, $\phi^h$ is an average of $\lim_{\tau \to 0} \rho_G(\tau, f)$ over the total K subcarriers.

Although $\phi^h$ can capture large movements in the environment, it could miss detecting weak/subtle motions (e.g. people's reading or sleeping) due to farther distance from the transceivers, noise in the environment, or transient motions. Therefore, to amplify the subtle changes in the ACF spectrum caused by small motion, the system can leverage the frequency diversity and utilize the maximum ratio combining (MRC) scheme to maximize the signal-noise-ratio (SNR) of the ACF. Since not all subcarriers are sensitive to the slight motion, the system may select the top N subcarriers with the largest $\phi^h$ for MRC and acquire the boosted ACF $\hat{\rho}_G(\tau, f)$. The small motion feature $\phi^s$ is then defined as the limit of $\hat{\rho}_G(\tau, f)$ with $\tau \to 0$, i.e., $$\phi^s \triangleq \frac{1}{N} \sum_{k=1}^{N} \hat{\rho}_G\left(\tau = \frac{1}{F_s}, f_k\right). \tag{5}$$

In some embodiments, the small motion feature $\phi^s$ can be defined as the maximum differential of boosted ACF $\hat{\rho}_G$ over $\tau$ as $$\phi^s \triangleq \max_\tau(|\Delta \hat{\rho}_G(\tau)|).$$

When there is not much physical movement in the environment, and when neither $\phi^h$ nor $\phi^s$ is substantial, the system can rely on the human vital signs to detect presence. Chest movement caused by breathing is significant compared to other vital signs such as heart rate, which might be too weak to be detected by the WiFi signal. The breathing motion is periodic, introducing periodic changes to the multipath signal propagation. Such a periodic change is evident from the ACF spectrogram as peaks at the corresponding time lag resulting from the high correlation of the CSI power. The breathing rate i.e., the breathing feature $\phi^b$ can be derived as, $$\phi^b \triangleq \frac{60}{\hat{\tau}} \qquad (6)$$

beats per minute (BPM), where t is the time lag of the first peak in $\hat{\rho}_G(\tau)$.

Movement Detection

Given the features extracted from the CSI time series, the next step is to perform detection by determining a suitable threshold. Knowing that the theoretical threshold for $\phi^h$ is 0, the system can use a threshold of $\gamma_h=0.1$, allowing for a noise margin. The threshold for small movement detection is determined empirically by observing quiet environments without human presence in several different environments, obtained as $\gamma_s=0.2$. In some embodiments, the threshold for small movement detection is determined as $\gamma_s=0.0002$, the breathing rates below 10 BPM($\gamma_{lb}$) and above 30 BPM ($\gamma_{hb}$) are discarded and considered out of the human breathing range.

At any given time instance, the system can first check for high motion. When a high movement is not detected at the current instance, the system may check for weak and breathing motion only if a significant motion $\phi^h > \gamma_{hh}=0.5$) is detected at least once in the last $W_T$ seconds. A conditional check on the weak movement patterns will help alleviate false detections.

Figure 4:
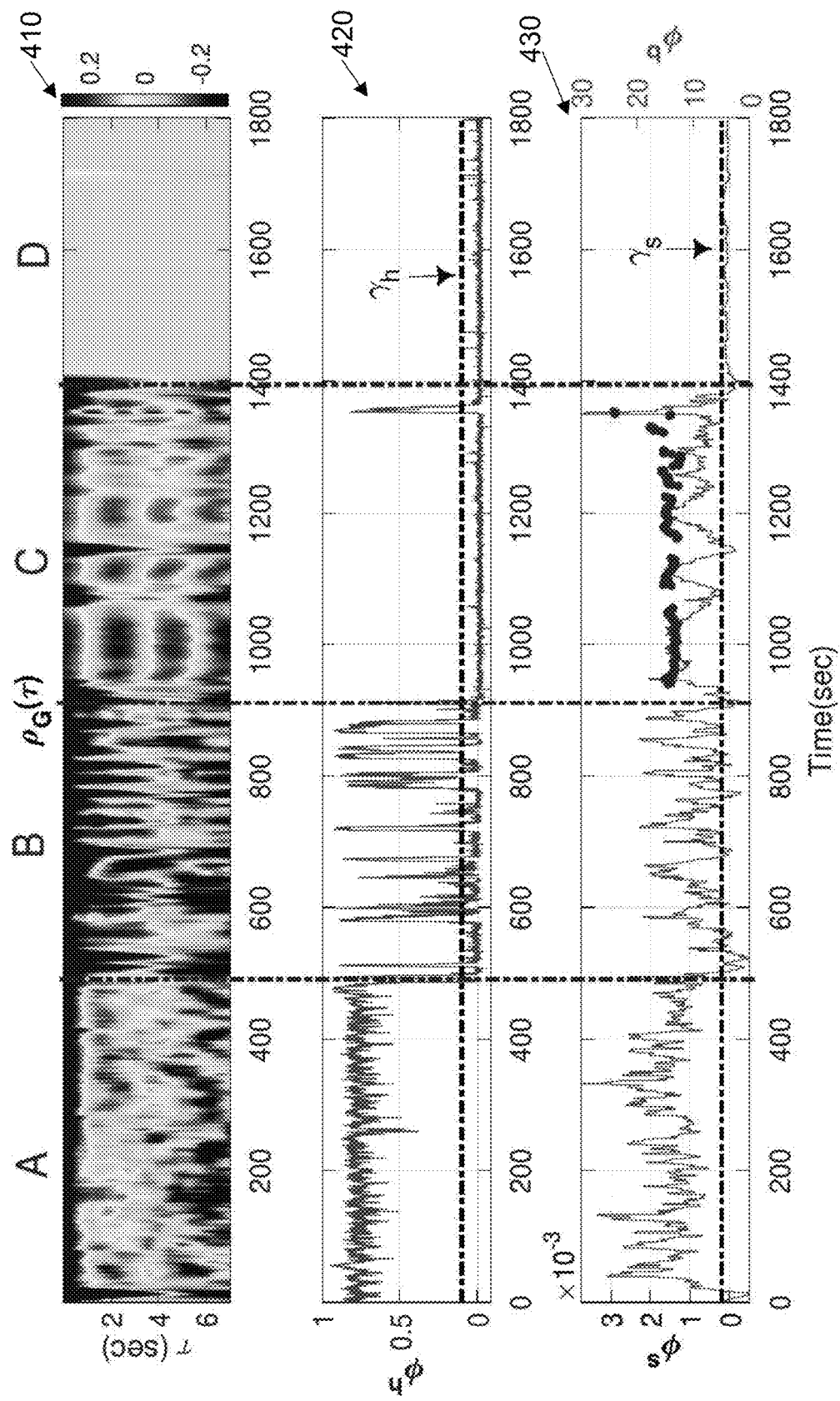
FIG. 4 shows exemplary features extracted from CSI time series by a wireless system, according to some embodiments of the present disclosure.

FIG. 4 shows an example of different levels of features extracted from CSI time series. Plot 410 shows ACF of the CSI power, plot 420 shows a high motion feature, and plot 430 shows a small motion feature overlaid with the breathing rate estimates. Dotted horizontal black lines indicate the thresholds for high ($\gamma_h$) and small ($\gamma_s$) motions. In this experiment, a person makes a high-intensity motion for time duration A, small intermittent motions in time duration B, followed by sleeping in the time duration C, and then leave the test area in time duration D.

As shown in FIG. 4, for the time duration A of high-intensity motion, $\phi^h$ is much higher than the threshold $\gamma_h$ and so is $\phi^s > \gamma_s$. For the time duration B of weaker intermittent motion, one can see that using $\phi^s$ can help if high motion is not detected. For the time duration C, the person was sleeping, which was picked up by breathing and $\gamma_s$. In cases of farther distance from the transceiver, $\phi^s$ could be less than $\gamma_s$ while still picking up $\phi^b$. Finally, the user leaves the place for the time duration D, and all the features become insignificant.

Movement Localization

After detecting a movement in the environment, the next step is to assign it to the correct location. The possible locations for movement are at the Rx for which at least one of the movement features is above their respective thresholds. However, when designing a more general system that can include multiple users and various types of device topologies, the system may do more than simple thresholding. Below are a few examples for potential location ambiguities.

In a first example, due to the broad coverage of the WiFi signal, a single person could affect enough multipath to induce high motion statistics $\phi^h$ in more than one Rx. Using a threshold on the motion statistics $\phi^h$ will cause inaccurate location estimates in such scenarios.

In a second example, a person near the Tx can create high $\phi^h$ in all the Rx due to the reciprocity of the WiFi channel. It becomes challenging to differentiate between one person moving near the Tx and multiple people moving at all Rx.

To resolve the above ambiguities, the system can determine if the movement features induced in any given two Rx are from a single body in the environment. Motion statistics $\phi^h$ can indicate the relative motion intensity at a given distance from the transceivers. When two Rx "see" a single motion source, the duration of high and low motion and the transitions between them are "correlated." On the other hand, the pattern of the increase and decrease in the $\phi^h$ is not the same when two Rx have stronger dynamic signals from different motion sources.

In some embodiments, one can observe the correlation of $\phi^h$ over a window ($W_c$) to determine if two Rx are affected/activated by the same motion source. Denoting the high motion features of two Rx i and j by $\phi_i^h$, and $\phi_j^h$ respectively, the correlation $C_{ij}$ is calculated as follows:

$$C_{ij}(t) = \frac{\sum_{x=t-W_c+1}^{t}(\phi_{i,x}^h - \bar{\phi}_i^h)(\phi_{j,x}^h - \bar{\phi}_j^h)}{\|\phi_i^h - \bar{\phi}_i^h\| \cdot \|\phi_j^h - \bar{\phi}_j^h\|}, \qquad (7)$$

where $\|\cdot\|$ operation denotes the norm of the vector and $(\cdot)$ denotes the mean operator.

Figure 5B:
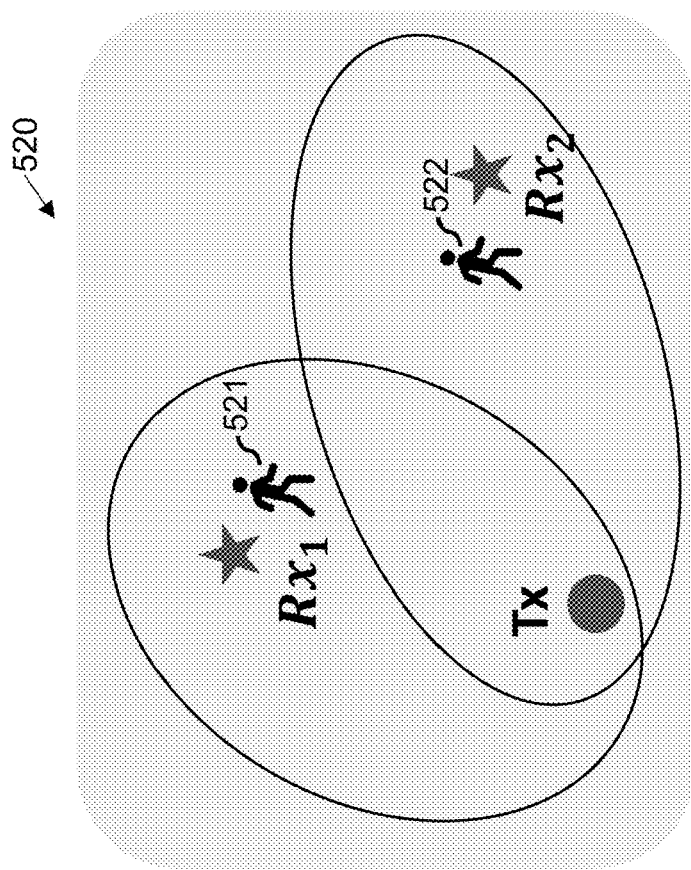
FIGS. 5A-5B show exemplary device setup and movement locations in two scenarios for wireless monitoring, according to some embodiments of the present disclosure.
Figure 5A:
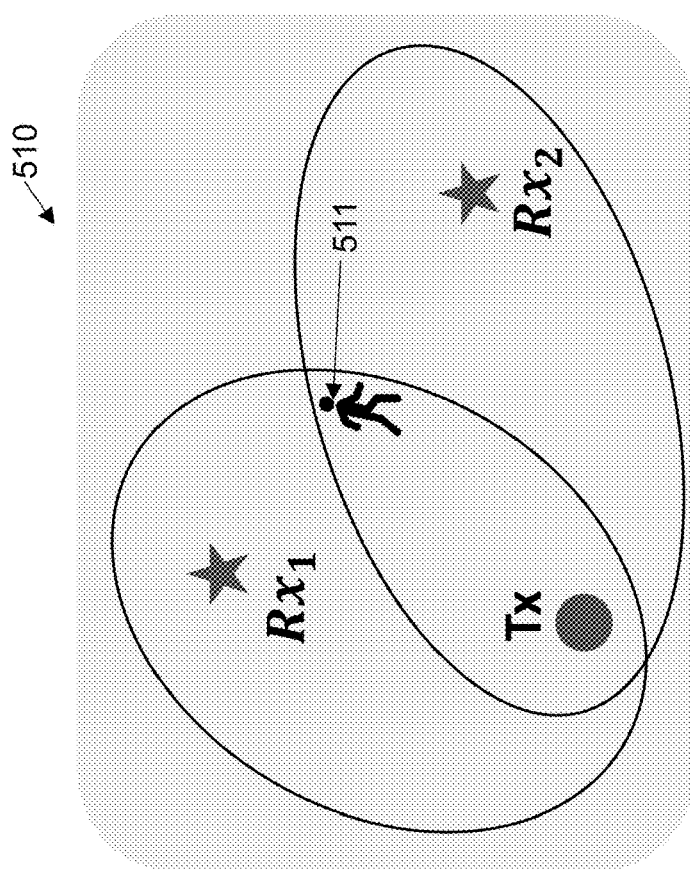

Following is an example of using $C_{ij}$ to solve ambiguous localization scenarios discussed before. Consider the two device setups and movement locations as shown in FIG. 5A and FIG. 5B, respectively. FIGS. 6A and 6B show motion statistics $\phi^h$ from Rx1 and Rx2 in scenario 510 (1 person) of FIG. 5A and scenario 520 (2 persons) of FIG. 5B, respectively. FIGS. 6C and 6D show correlation of $\phi^h$ from Rx1 and Rx2 and the correlation threshold in scenario 510 (1 person) of FIG. 5A and scenario 520 (2 persons) of FIG. 5B, respectively.

In scenario 510 shown in FIG. 5A, motion from Person 1 511 resulted in high $\phi^h$ both in Rx$_1$ and Rx$_2$. However, the trend of the $\phi^h$ is the same in both. On the other hand, $\phi^h$ calculated by Rx$_1$ and Rx$_2$ for persons 521, 522, in scenario 520 shown in FIG. 5B shows a different pattern with time. The amount of similarity is evident from the correlation metric shown in FIG. 6C and FIG. 6D. The dashed black lines in FIG. 6C and FIG. 6D show the correlation threshold used in this example. The correlation between two motion statistics vectors in a window is high when they follow a similar trend of increasing and decreasing patterns. However, when the motion is continuously high, there are no distinct patterns in the motion statistics, and the correlation is not very high. The minor variations in the values could result from a different multipath environment, as seen by the two receivers. Therefore, the system can relax the correlation threshold ($C_{th}=0.7$) if the $\phi^h$ are higher than $\gamma=0.1$ for at least 95% of the window time (30 sec). The system can use correlation for motion localization only when a high motion is detected. In some embodiments, the person does not change locations for smaller motion and breathing durations as the walking motion can be captured by the high motion feature during location transitions.

In some embodiments, the steps for movement detection and movement localization are given in Algorithm 1 and Algorithm 2, respectively.

---

Algorithm 1 Motion detection

1:     if $\phi^h(t) > \gamma_{hh}$ then $d_i^{hh}(t) = 1$
2:     if $\phi^h(t) > \gamma_h$ then $d_i^h(t) = 1$
3:     if $d_i^h(t) == 0$ & any($d_i^{hh}(t - W_T + 1 : t)) = 1$ then -continued Algorithm 1 Motion detection 4:     if $\phi^s(t) > \gamma_s$ then $d_i^s(t) = 1$
5:     if $\gamma_{bl} < \phi^b(t) < \gamma_{bh}$ then $d_i^b(t) = 1$
6:     end if Algorithm 2

Motion Localization $$\hat{\phi}_i^h = \frac{1}{W_l} \sum \phi_i^h(t - W_l + 1 : t)$$

Figure 7B:
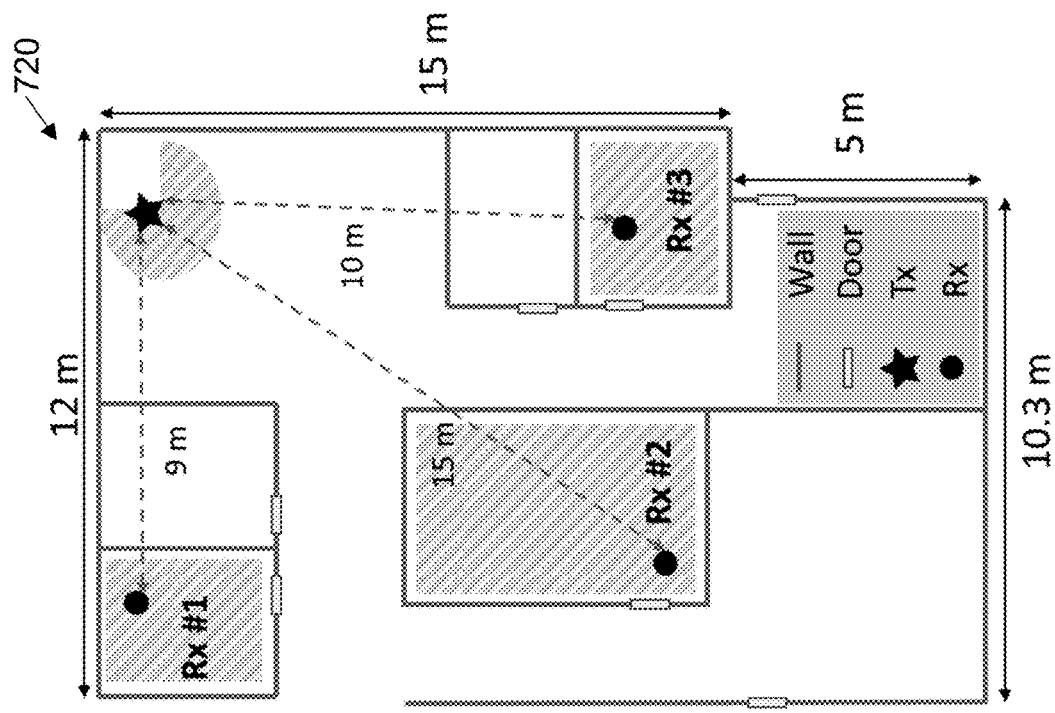
FIGS. 7A-7B show exemplary locations of transmitters and receivers in different setup environments, according to some embodiments of the present disclosure.
Figure 7A:
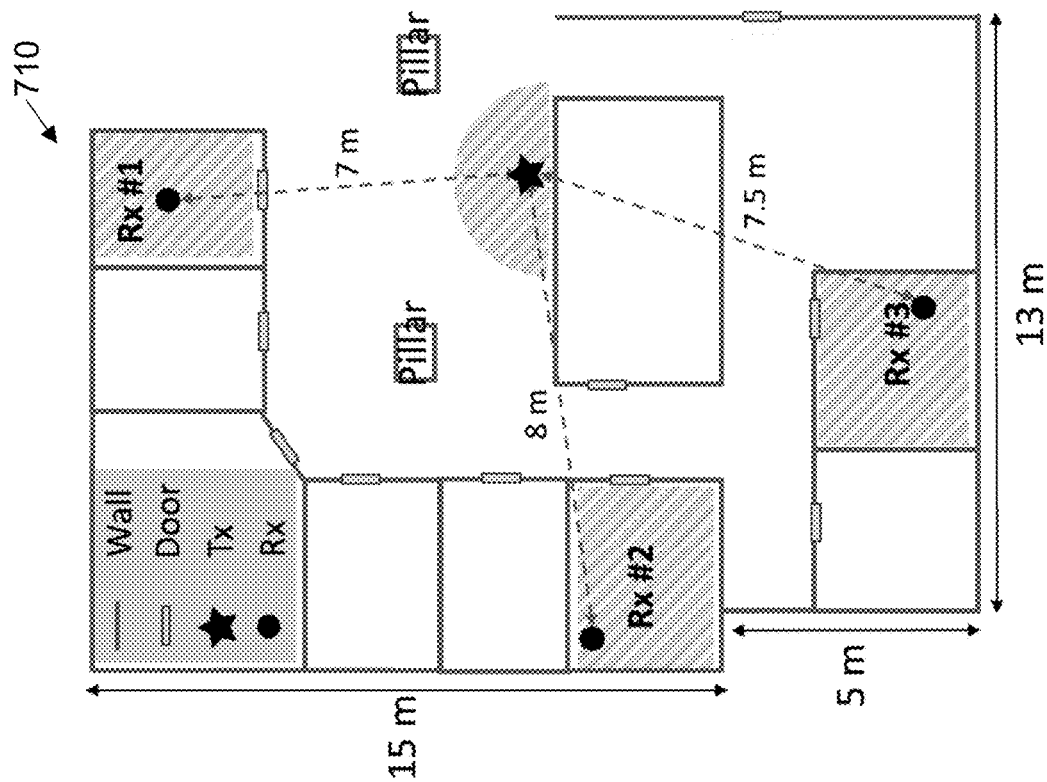

2:   $v^h = \{i / d_i^h(t) = 1\}$
    Sort $v^h$ in decreasing order of $\hat{\phi}_i^h$.) → $\overline{\alpha}(t)$
4:   $\tilde{I}(t) = \overline{\alpha}[1]$, $\overline{\beta}(t) = [1]$, $\overline{\alpha}(t) = \overline{\alpha}[2 : \text{end}]$
    for i in $\overline{\alpha}(t)$ do,
6:     for j in $\tilde{I}(t)$ do
        if $C_{ij} < \gamma_c$ then,
8:           $\tilde{I}(t) = [\tilde{I}(t), \quad i]$
        else
10:           Replace j with i if $\hat{\phi}_j^h < \hat{\phi}_i^h$
          $\overline{\beta}(t)[\tilde{I}(t) == j || \tilde{I}(t) == i] + = 1$
12:         end if
      end for
14:     end for
    $v^s = \{i / d_i^s(t) = 1 || d_i^b(t) = 1\}$
16:   Sort $v^h$ in decreasing order of $\hat{\phi}_i^h$.) → $\overline{\alpha}(t)$
    if $\tilde{I}(t)$ is empty then $\tilde{I}(t) = \overline{\alpha}[1]$, $\overline{\alpha}(t) = (\tilde{t})[2 : \text{end}]$
18:   Repeat steps 5-14 with $\phi^s$ instead of $\phi^h$.
    if All bots detect motion/breathing then
20:     ⇒ potential Tx location.
      $\tilde{I}(t)[\overline{\beta}(t) == \max\{\overline{\beta}(t)\}] = \text{Tx}$
22:   end if
    return $\tilde{I}(t)$ In some examples, the performance of the disclosed system is evaluated in two different device setups and environments 710, 720 as shown in FIG. 7A and FIG. 7B respectively. The metrics used for evaluation are the detection rate (DR) for movement detection and localization accuracy. DR for movement detection is the percentage of the time a movement is detected out of the total time of human presence in the monitoring area. Localization accuracy is the percentage of time in which the disclosed system correctly identifies the location of motion out of the total time of movement detection.

In some examples, a prototype is built on commercial WiFi chipsets and uses a sampling rate of 200 Hz for CSI collection. The system operates on 5 GHz WiFi with a 40 MHz bandwidth and includes a 2×2 MIMO antenna. In all the experiments, the users maintained a distance of at least 1 m from the respective Tx/Rx. Closer movement is detected even better. In addition, the system does not know about the number of users in the environment beforehand, which is estimated by the system using correlation.

In experiments for one-person scenarios, only one person was in the environment performing different levels of motion at different Rx and at the Tx. The average presence detection rate is 99.72% and 99.62% in setup one and two, respectively. Table III shows a summary of the test cases that include different physical activity levels. In Table III, "high" indicates walking motion, "small" refers to low-intensity movements such as sitting at a desk and working on a laptop, and "sleep" scenario involves taking a nap in a chair. In the localization step, the system can use correlation only when the motion is high using the high motion feature $\phi^h$. When a small motion or breathing is detected, the system can just perform detection using thresholding and continue with the previous location results. In some embodiments, a high motion is triggered when the person transitions between locations. The average localization accuracy when the person is at the Rx is 100%, and the Tx is 92.26%.

TABLE III

Presence detection in 1-person scenario

| Location | Activity | S1-DR(%) | S2-DR(%) |
|---|---|---|---|
| Rx | High | 100 | 100 |
|  | Small | 100 | 98.43 |
|  | Sleep | 100 | 100 |
| Tx | High | 100 | 100 |
|  | Small | 98.32 | 99.3 |
|  | Sleep | 100 | 100 |

In experiments for two-person scenarios, two people performed different levels of physical activities at Tx and Rx, as shown in Table IV. The average presence detection rate is 99.19% and 98.53% in setup one and two, respectively. The average localization accuracy when two people are present at different Rx is 100% and when one person is at the Tx and the other at one of the Rx is 87%. A lower localization accuracy for the latter case is because a high motion at the Tx dominates the motion in all the Tx-Rx links, occasionally masking movements at the Rx. One approach to improve the performance in such cases is to use "multiway-sensing."

TABLE IV

Presence detection in 2-person scenario

| Loc1 | Loc2 | Activity1 | Activity2 | S1-DR(%) | S2-DR(%) |
|---|---|---|---|---|---|
| $Rx_i$ | $Rx_j$ | High | High | 100 | 100 |
|  |  | High | Small | 100 | 100 |
|  |  | High | Sleep | 100 | 100 |
|  |  | Small | Small | 100 | 99.2 |
|  |  | Small | Sleep | 97.3 | 100 |
|  |  | Sleep | Sleep | 100 | 98.2 |
| Tx | $Rx_j$ | High | High | 100 | 94.3 |
|  |  | High | Small | 100 | 100 |
|  |  | High | Sleep | 100 | 100 |
|  |  | Small | High | 100 | 100 |
|  |  | Small | Small | 99.93 | 99.2 |
|  |  | Small | Sleep | 99.56 | 91 |
|  |  | Sleep | High | 100 | 100 |
|  |  | Sleep | Small | 91.2 | 99.1 |
|  |  | Sleep | Sleep | 100 | 97 |

Various embodiments of the present teaching disclose a passive indoor localization system built upon commercial WiFi. An improved human presence detection pipeline is used to detect even minute physical human movements. The disclosed micro motion statistics and breathing rate estimation can detect even the weakest physical movements that cannot be detected by the most widely used sensors today. Further, the disclosed correlation-based approach has addressed localization ambiguities that arise in the case of multiple people. As a result, the system can achieve a localization accuracy of 98.5% in single-person scenarios and 93.5% in the case of multiple people over experiments conducted in two different environments and setups. Overall, the present teaching discloses a robust, low-cost, easy-to-use localization solution that can provide reliable human activity logs of daily life. Such information is invaluable to several potential innovative smart home and health care applications.

Figure 8:
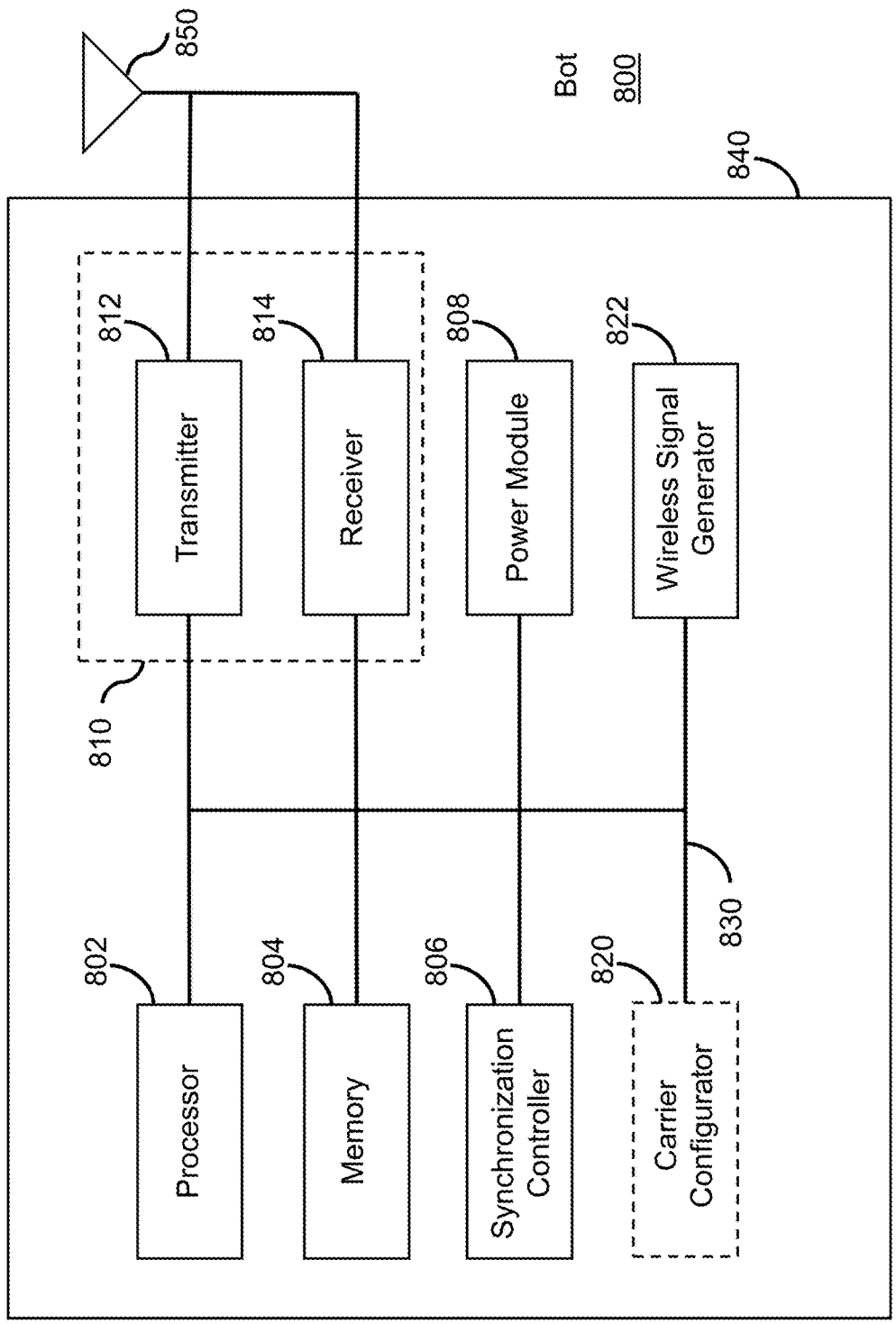
FIG. 8 illustrates an exemplary block diagram of a first wireless device of a system for wireless monitoring and localization, according to some embodiments of the present disclosure.

FIG. 8 illustrates an exemplary block diagram of a first wireless device, e.g. a Bot 800, of a system for wireless monitoring and localization, according to one embodiment of the present teaching. The Bot 800 is an example of a device that can be configured to implement the various methods described herein. As shown in FIG. 8, the Bot 800 includes a housing 840 containing a processor 802, a memory 804, a transceiver 810 comprising a transmitter 812 and receiver 814, a synchronization controller 806, a power module 808, an optional carrier configurator 820 and a wireless signal generator 822.

In this embodiment, the processor 802 controls the general operation of the Bot 800 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 804, which can include both read-only memory (ROM) and random access memory (RAM), can provide instructions and data to the processor 802. A portion of the memory 804 can also include non-volatile random access memory (NVRAM). The processor 802 typically performs logical and arithmetic operations based on program instructions stored within the memory 804. The instructions (a.k.a., software) stored in the memory 804 can be executed by the processor 802 to perform the methods described herein. The processor 802 and the memory 804 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 810, which includes the transmitter 812 and receiver 814, allows the Bot 800 to transmit and receive data to and from a remote device (e.g., an Origin or another Bot). An antenna 850 is typically attached to the housing 840 and electrically coupled to the transceiver 810. In various embodiments, the Bot 800 includes (not shown) multiple transmitters, multiple receivers, and multiple transceivers. In one embodiment, the antenna 850 is replaced with a multi-antenna array 850 that can form a plurality of beams each of which points in a distinct direction. The transmitter 812 can be configured to wirelessly transmit signals having different types or functions, such signals being generated by the processor 802. Similarly, the receiver 814 is configured to receive wireless signals having different types or functions, and the processor 802 is configured to process signals of a plurality of different types.

The Bot 800 in this example may serve as a Bot or Type 1 device, e.g. Tx 102, 202, or any other transmitter in FIGS. 1-7, for wireless monitoring and localization in a venue. For example, the wireless signal generator 822 may generate and transmit, via the transmitter 812, a wireless signal through a wireless multipath channel impacted by a motion of an object in the venue. The wireless signal carries information of the channel Because the channel was impacted by the motion, the channel information includes motion information that can represent the motion of the object. As such, the motion can be indicated and detected based on the wireless signal. The generation of the wireless signal at the wireless signal generator 822 may be based on a request for motion detection from another device, e.g. an Origin, or based on a system pre-configuration. That is, the Bot 800 may or may not know that the wireless signal transmitted will be used to detect motion.

The synchronization controller 806 in this example may be configured to control the operations of the Bot 800 to be synchronized or un-synchronized with another device, e.g. an Origin or another Bot. In one embodiment, the synchronization controller 806 may control the Bot 800 to be synchronized with an Origin that receives the wireless signal transmitted by the Bot 800. In another embodiment, the synchronization controller 806 may control the Bot 800 to transmit the wireless signal asynchronously with other Bots. In another embodiment, each of the Bot 800 and other Bots may transmit the wireless signals individually and asynchronously.

The carrier configurator 820 is an optional component in Bot 800 to configure transmission resources, e.g. time and carrier, for transmitting the wireless signal generated by the wireless signal generator 822. In one embodiment, each CI of the time series of CI has one or more components each corresponding to a carrier or sub-carrier of the transmission of the wireless signal. The detection of the motion may be based on motion detections on any one or any combination of the components.

The power module 808 can include a power source such as one or more batteries, and a power regulator, to provide regulated power to each of the above-described modules in FIG. 8. In some embodiments, if the Bot 800 is coupled to a dedicated external power source (e.g., a wall electrical outlet), the power module 808 can include a transformer and a power regulator.

The various modules discussed above are coupled together by a bus system 830. The bus system 830 can include a data bus and, for example, a power bus, a control signal bus, and/or a status signal bus in addition to the data bus. It is understood that the modules of the Bot 800 can be operatively coupled to one another using any suitable techniques and mediums.

Although a number of separate modules or components are illustrated in FIG. 8, persons of ordinary skill in the art will understand that one or more of the modules can be combined or commonly implemented. For example, the processor 802 can implement not only the functionality described above with respect to the processor 802, but also implement the functionality described above with respect to the wireless signal generator 822. Conversely, each of the modules illustrated in FIG. 8 can be implemented using a plurality of separate components or elements.

Figure 9:
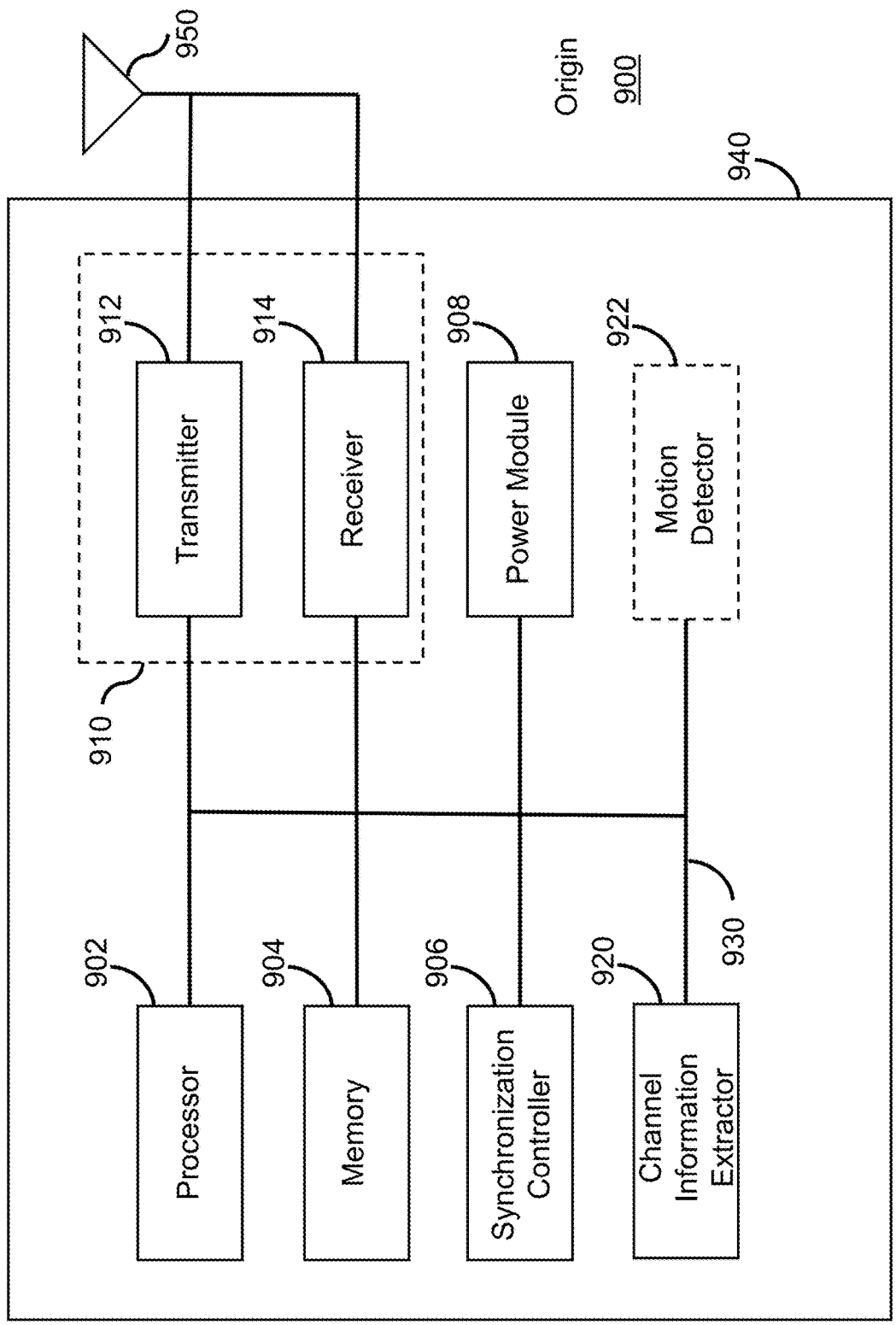
FIG. 9 illustrates an exemplary block diagram of a second wireless device of a system for wireless monitoring and localization, according to some embodiments of the present disclosure.

FIG. 9 illustrates an exemplary block diagram of a second wireless device, e.g. an Origin 900, of a system for wireless monitoring and localization, according to one embodiment of the present teaching. The Origin 900 is an example of a device that can be configured to implement the various methods described herein. The Origin 900 in this example may serve as an Origin or Type2 device, e.g. Rx 111, 112, 113, 211, 212 or any other receiver in FIGS. 1-7, for wireless monitoring and localization in a venue. As shown in FIG. 9, the Origin 900 includes a housing 940 containing a processor 902, a memory 904, a transceiver 910 comprising a transmitter 912 and a receiver 914, a power module 908, a synchronization controller 906, a channel information extractor 920, and an optional motion detector 922.

In this embodiment, the processor 902, the memory 904, the transceiver 910 and the power module 908 work similarly to the processor 802, the memory 804, the transceiver 810 and the power module 808 in the Bot 800. An antenna 950 or a multi-antenna array 950 is typically attached to the housing 940 and electrically coupled to the transceiver 910.

The Origin 900 may be a second wireless device that has a different type from that of the first wireless device (e.g. the Bot 800). In particular, the channel information extractor 920 in the Origin 900 is configured for receiving the wireless signal through the wireless multipath channel impacted by the motion of the object in the venue, and obtaining a time series of channel information (CI) of the wireless multipath channel based on the wireless signal. The channel information extractor 920 may send the extracted CI to the optional motion detector 922 or to a motion detector outside the Origin 900 for detecting object motion in the venue.

The motion detector 922 is an optional component in the Origin 900. In one embodiment, it is within the Origin 900 as shown in FIG. 9. In another embodiment, it is outside the Origin 900 and in another device, which may be a Bot, another Origin, a cloud server, a fog server, a local server, and an edge server. The optional motion detector 922 may be configured for detecting the motion of the object in the venue based on motion information related to the motion of the object. The motion information associated with the first and second wireless devices is computed based on the time series of CI by the motion detector 922 or another motion detector outside the Origin 900.

The synchronization controller 906 in this example may be configured to control the operations of the Origin 900 to be synchronized or un-synchronized with another device, e.g. a Bot, another Origin, or an independent motion detector. In one embodiment, the synchronization controller 906 may control the Origin 900 to be synchronized with a Bot that transmits a wireless signal. In another embodiment, the synchronization controller 906 may control the Origin 900 to receive the wireless signal asynchronously with other Origins. In another embodiment, each of the Origin 900 and other Origins may receive the wireless signals individually and asynchronously. In one embodiment, the optional motion detector 922 or a motion detector outside the Origin 900 is configured for asynchronously computing respective heterogeneous motion information related to the motion of the object based on the respective time series of CI.

The various modules discussed above are coupled together by a bus system 930. The bus system 930 can include a data bus and, for example, a power bus, a control signal bus, and/or a status signal bus in addition to the data bus. It is understood that the modules of the Origin 900 can be operatively coupled to one another using any suitable techniques and mediums.

Although a number of separate modules or components are illustrated in FIG. 9, persons of ordinary skill in the art will understand that one or more of the modules can be combined or commonly implemented. For example, the processor 902 can implement not only the functionality described above with respect to the processor 902, but also implement the functionality described above with respect to the channel information extractor 920. Conversely, each of the modules illustrated in FIG. 9 can be implemented using a plurality of separate components or elements.

In one embodiment, in addition to the Bot 800 and the Origin 900, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 922 or a motion detector outside the Origin 900 is configured for detecting the motion of the object in the venue based on both the motion information associated with the first and second wireless devices and additional motion information associated with the third and fourth wireless devices computed by at least one of: an additional motion detector and the fourth wireless device based on the time series of additional CI.

Figure 10:
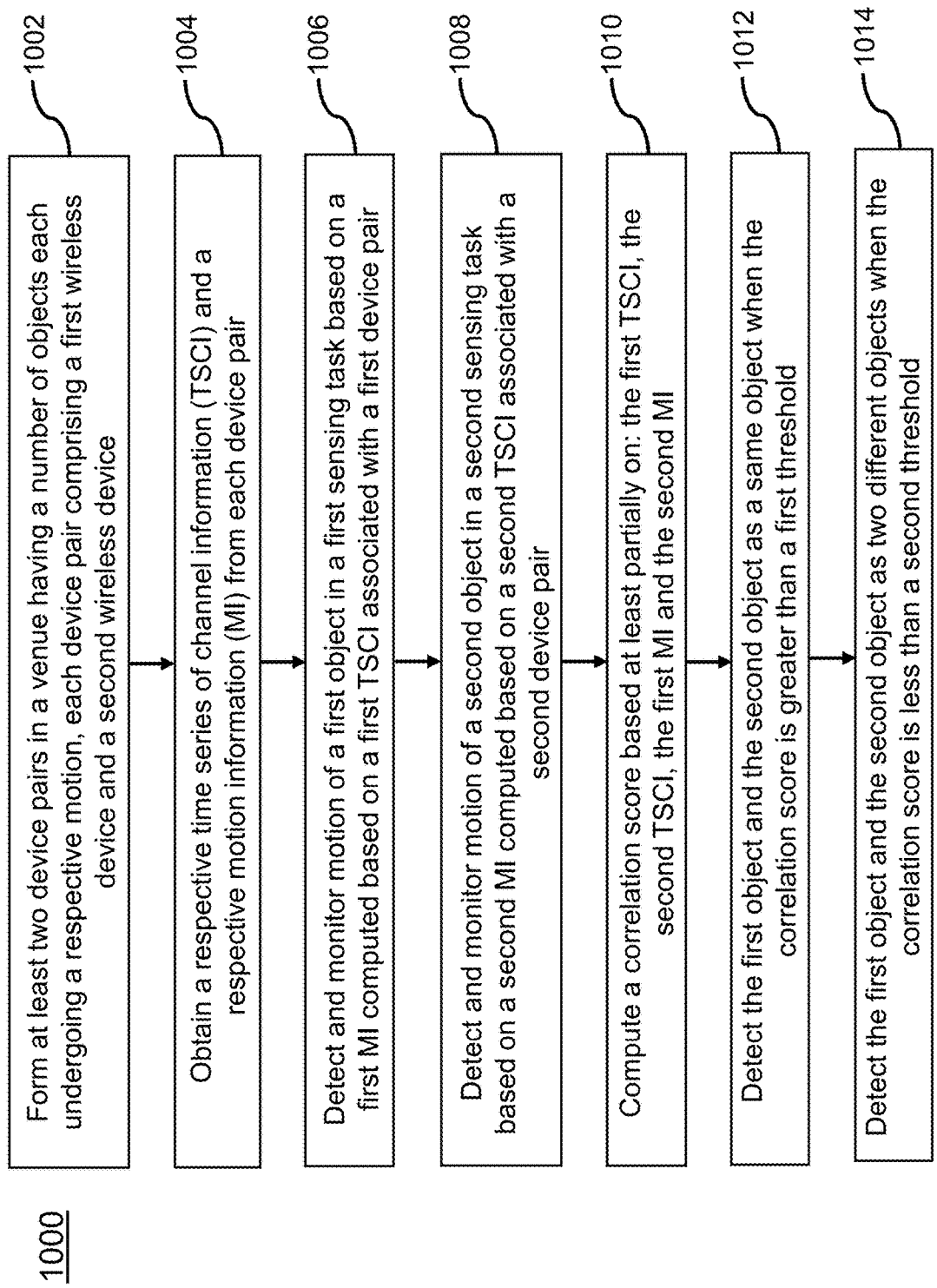
FIG. 10 illustrates a flow chart of an exemplary method for wireless monitoring and localization, according to some embodiments of the present disclosure.

FIG. 10 illustrates a flow chart of an exemplary method 1000 for wireless monitoring and localization, according to some embodiments of the present disclosure. In various embodiments, the method 1000 can be performed by the systems disclosed above. At operation 1002, at least two device pairs are formed in a venue having a number of objects each undergoing a respective motion, each device pair comprising a first wireless device and a second wireless device. At operation 1004, a respective time series of channel information (TSCI) and a respective motion information (MI) are obtained from each device pair. At operation 1006, motion of a first object is detected and monitored in a first sensing task based on a first MI computed based on a first TSCI associated with a first device pair. At operation 1008, motion of a second object is detected and monitored in a second sensing task based on a second MI computed based on a second TSCI associated with a second device pair. At operation 1010, a correlation score is computed based at least partially on: the first TSCI, the second TSCI, the first MI and the second MI. At operation 1012, the first object and the second object are detected as a same object when the correlation score is greater than a first threshold. At operation 1014, the first object and the second object are detected as two different objects when the correlation score is less than a second threshold.

Figure 11:
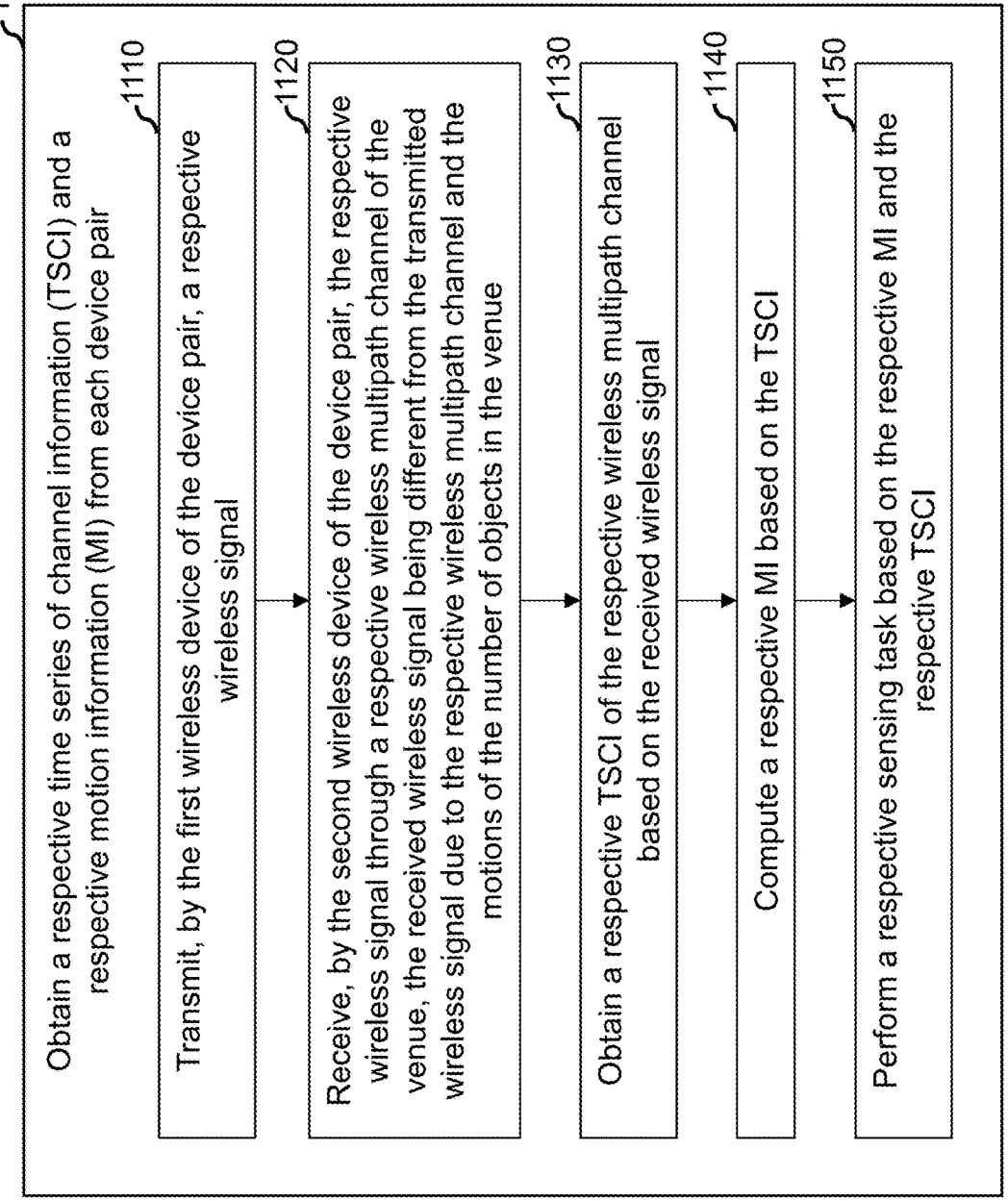
FIG. 11 illustrates a flow chart showing detailed operations for wireless monitoring and localization, according to some embodiments of the present disclosure.

FIG. 11 illustrates a flow chart showing detailed operations 1100 for wireless monitoring and localization, according to some embodiments of the present disclosure. In some embodiments, the operations 1100 may be performed by each device pair as part of the operation 1004 in FIG. 10. At operation 1110, a respective wireless signal is transmitted by the first wireless device of the device pair. At operation 1120, the respective wireless signal is received by the second wireless device of the device pair through a respective wireless multipath channel of the venue, the received wireless signal being different from the transmitted wireless signal due to the respective wireless multipath channel and the motions of the number of objects in the venue. At operation 1130, a respective TSCI of the respective wireless multipath channel is obtained based on the received wireless signal. At operation 1140, a respective MI is computed based on the TSCI. At operation 1150, a respective sensing task is performed based on the respective MI and the respective TSCI.

The order of the operations in any one of the drawings may be changed according to various embodiments of the present teaching.

In some embodiments, there may be at least one wireless network (e.g. WiFi, WLAN, IEEE 802.11/1ln/1 lac/1 lax/1 lbe/1 lbf, 4G/LTE/5G/6G/7G/8G, mesh network, IEEE 802.15/16, Bluetooth, WiMax, Zigbee) in a venue comprising an access point(AP)/router/mesh router/hub/base station for each wireless network and a number of heterogeneous wireless devices each in a respective wireless network. A disclosed system/device/method/software can comprise multiple pairs of Type 1 (TX) devices and Type2 (RX) devices in a many-to-many configuration. Any Type 1 device and/or Type2 device may be any of the access point(AP)/router/mesh router/hub/base station of the at least one wireless network, or any of various heterogeneous wireless devices in the wireless network. In some embodiments, some or all of the multiple Type 1 (TX) devices may be a common device (e.g. the AP/router/mesh router/hub/base station) such that the associated pairs of TX/RX form a one-to-many configuration. In some embodiments, some or all of the multiple Type2 (RX) devices may be a common device (e.g. the AP/router/mesh router/hub/base station) such that the associated TX/RX pairs form in a many-to-one configuration.

In some embodiments, for each pair of Type1 (TX) device and Type2 (RX) device, a respective wireless signal (e.g. sounding signal, NDP, NDPA, TF) is transmitted from the respective TX to the respective RX through a respective wireless multipath channel in the venue. The respective received wireless signal differs from the respective transmitted wireless signal due to the respective wireless multipath channel of the venue and motion of a number (e.g. unknown number) of objects (e.g. people, users, pets, machines) in the venue. A respective time series of channel information (TSCI) of the respective wireless channel is obtained.

In some embodiments, a respective sensing task associated with the respective pair of TX and RX is performed based on the respective TSCI to monitor the motion of the objects. The task may comprise one or more subtasks. The task or subtask may comprise any of: motion detection/estimation, presence detection, breathing detection/estimation, heart beat detection/estimation, fall-down detection, tracking, sleep monitoring, pet monitoring, well-being monitoring, activity of daily living (ADL) monitoring, etc. A respective motion information (MI)/motion statistics (MS)/characteristics/spatial-temporal information (STI) may be computed based on the respective TSCI. The respective sensing task or an associated subtask may be performed based on the respective MUMS/characteristics/STI. For example a first task or subtask (e.g. sleeping monitoring) may be performed based on a first MI/MS/characteristics/STI computed based on a first TSCI obtained from a first wireless signal transmitted from a first TX to a first RX. A different task or subtask (e.g. activity of daily living or ADL) may be performed based on a second MUMS/characteristics/STI computed based on a second TSCI obtained from a second wireless signal transmitted from a second TX to a second RX. There may/may not be a common/same task or subtask (e.g. motion detection) performed in all pairs of TX and RX.

In some embodiments, a common MI/MS/STI/characteristics may be computed based on each of the TSCI such that the common MUMS/STI/characteristics of the multiple TX/RX pairs may be compared. For each TX/RX pair, the respective common MI/MS/STI/characteristics computed based on the respective TSCI may be used to perform the respective sensing task (e.g. the common/same task or subtask). The amount of the objects may be unknown. There may be zero, one, two, or more objects. The location of the number of objects in the venue may be unknown. In other words, there may be an unknown number of objects at unknown locations undergoing respective motion (e.g. some may be stationary/non-stationary/moving/walking/running/exercising/sleeping/working/talking, moving quickly/slowly/regularly/irregularly/intermittently, etc.).

In some embodiments, the disclosed system/device/method/software may detect/acquire/capture/monitor motion of the objects based on any/some/all of the TSCI and locate/count/track the objects (e.g. one or some or all) based on the detected/monitored motion. For each pair of TX and RX, motion may/may not be detected/acquired/captured/monitored based on the respective TSCI. For example, the motion of an object far away from (or beyond) an effective range/neighborhood of the pair of TX/RX may not be detected/acquired/captured/monitored by the pair of TX/RX and the respective TSCI. As a result, some motion (i.e. some motion of some object(s)) may be detected/acquired/captured/monitored in some pairs of TX/RX while no motion may be detected/acquired/captured/monitored in some other pairs of TX/RX.

In some embodiments, any detected/acquired/captured/monitored motion by a pair of TX/RX (based on the respective TSCI) may be associated with one or more objects (e.g. unknown objects, or known objects). Typically, it is more likely to be associated with one object (instead of more than one objects). In the case of more than one objects whose motions are detected/acquired/captured/monitored by the pair of TX/RX, the more than one objects may be near each other such that they are "located" at the "same location" (i.e. same zone/region/neighborhood in the venue).

The venue may be partitioned into multiple zones (or regions/neighborhoods/partitions/divisions) in the venue, each zone associated with either a Type 1 device (TX), or a Type2 device (RX), or a pair of TX/RX. The zones may/may not overlap. A device may function as TX in a first TX/RX pair, as TX in a second TX/RX pair, as RX in a third TX/RX pair and as RX in a fourth TX/RX. In this case, there may be four zone associated with the device, a first zone for its role as TX in the first TX/RX pair, a second zone for its role as TX in the second TX/RX pair, a third zone for its role as RX in the third TX/RX pair and a fourth zone for its role as RX in the fourth TX/RX pair.

In some embodiments, a first motion (associated with one or more first particular objects) may be detected/acquired/captured/monitored by a pair of first particular TX and first particular RX in a first sensing task based on an associated first TSCI obtained from a first wireless signal transmitted from the first particular TX to the first particular RX (and the associated first MI/MS/characteristics/STI computed based on the first TSCI), the one or more first particular objects (e.g. known/unknown objects) may be located in/associated with a first zone associated with at least one of: the first particular TX, the first particular RX, or the pair of first particular TX and first particular RX. In some embodiments, a second motion (associated with one or more second particular objects) is detected/acquired/captured/monitored by a pair of second particular TX and second particular RX in a second sensing task based on an associated second TSCI obtained from a second wireless signal transmitted from the second particular TX to the second particular RX (and the associated second MI/MS/characteristics/STI computed based on the first TSCI), the one or more second particular objects (e.g. known/unknown objects) may be located in/associated with a second zone associated with at least one of: the second particular TX, the second particular RX, or the pair of second particular TX and second particular RX.

While the first sensing task may be different from the second sensing task, the first MUMS/STU characteristics may be mathematically and/or statistically similar to (or the same as) the second MI/MS/characteristics/STI, such that they can be compared. For example, their mathematical formula may be identical if the first TSCI is identical to the second TSCI. For example, the mathematical formula of both may be similar because they are both an average/weighted average (e.g. over a time window/time period/range/band/spatial streams/CI components, etc.), or a variance, or a statistics, or an autocorrelation function (ACF), or a feature of the autocorrelation function, or a transform, or a projection, or a derivative/differential/difference, or an integration/sum, or a linear/nonlinear function. For example, the mathematical formula of both may be similar because both are a same function of: a magnitude or a magnitude square or a phase of CI, or a second function of the magnitude or the phase.

In some embodiments, each wireless signal may comprise a time series of sounding signals. Each CI may be obtained from a respective received sounding signal. The first wireless signal and second wireless signal may be similar or different, with similar/different configuration, frequency band (e.g. 2.4 GHz/5 GHz/24 GHz/60 GHz/70+GHz), bandwidth (e.g. 20 MHz/40 MHz/80 MHz/160 MHz/320 MHz/640 MHz), amount of spatial streams (due to amount of TX antennas and RX antennas) (e.g. 1/2/3/4/6/8/9/10/12/etc.), timing of sounding signals, sounding frequency (e.g. 0.01 Hz/0.1 Hz/1 Hz/10 Hz/100 Hz/1 kHz/10 kHz, or irregular/intermittent), sounding period, etc. As a result, the first TSCI and the second TSCI may be similar/different/asynchronous/not aligned.

To further locate the objects, the disclosed system/device/method/software resolves/distinguishes/differentiates/decides/detects between two cases/situations/possibilities based on the first TSCI and second TSCI, and the associated first MI/MS/characteristics/STI and second MI/MS/STI/ characteristics computed based on the first and second TSCI. In the first case, the first particular objects are the second particular objects and the first motion is the second motion. In the second case, the first particular objects are not the second particular objects (at least not entirely, i.e. at least one object in the first particular object is not present in the second particular objects) and the first motion is not the second motion. In the first case, the first particular objects and the second particular objects are registered/grouped/regarded/classified/detected/considered/combined/merged/joined/consolidated/united/linked/pooled/fused/mixed/associated/connected/attached as the same object(s) at the same location (i.e. the same zone, an intersection zone of the first zone and the second zone). In the second case, the first particular objects and the second particular objects are registered/grouped/regarded/classified/detected/considered/separated/split/broken up/set apart/divided/segregated/differentiated/distinguished/dissociated/disconnected/detached as different/distinct/separate/detached/disconnected/independent/individual object(s) at different locations (i.e. first particular objects at first zone and second particular objects at second zone).

In some embodiments, to differentiate/distinguish between the two cases, the first MI/MS/STI/characteristics may be compared with the second MUMS/STI/characteristics. Recall that the first MI/MS/STI/characteristics may be mathematically/statistically similar (or the same as) the second MI/MS/STI/characteristics, and thus they can be compared. In the first case, the first MI/MS/STI/characteristics should be highly correlated with the second MI/MS/STI/characteristics because their fluctuations are due to the same motion of the same object(s). In the second case, the first MI/MS/STI/characteristics should not be highly correlated (e.g. uncorrelated, or close to uncorrelated) with the second MI/MS/STI/characteristics because their fluctuations are due to the different (independent) motion of different object(s).

In some embodiments, a score/measure of correlation between the time series of first MI/MS/STI/characteristics and the time series of second MUMS/STI/characteristics may be computed. If the measure of correlation is higher than a first threshold (T1), the first case may be detected. If the measure of correlation is lower than a second threshold (T2, e.g. a T2<T1), the second case may be detected. The first threshold may be equal to the second threshold. If the measure of correlation is between the first threshold and second threshold, a second measure of correlation may be computed (e.g. between the first MUMS/STI/characteristics and the second MI/MS/STI/characteristics, or between a third MI/MS/STI/characteristics computed based on the first TSCI and a fourth MI/MS/STI/characteristics computed based on the second TSCI). If the second measure of correlation is higher than a third threshold (T3), the first case may be detected. If the second measure of correlation is lower than a fourth threshold (T4, e.g. a T4<T3), the second case may be detected. If the second measure of correlation is between the third threshold and the fourth threshold, an additional measure of correlation may be computed (e.g. between the first and second MI/MS/STI/characteristics, between the third and fourth MI/MS/STI/characteristics, or between a fifth MUMS/STI/characteristics computed based on the first TSCI and a sixth MI/MS/STI/characteristics computed based on the second TSCI). So on and so forth.

In some embodiments, a time series of the first MI/MS/STI/characteristics may be computed based on the first TSCI, each MI/MS/STI/characteristics computed based on a respective sliding window of the TSCI. A time series of the second MI/MS/STI/characteristics may be computed based on the second TSCI. As the first TSCI and second TSCI may be different (e.g. different sounding frequency, sounding timing, bandwidth, spatial stream, etc.) A compensation may be performed on the first MI/MS/STI/characteristics and the second MI/MS/STI/characteristics. A synchronization may be performed on the first TSCI and the second TSCI. The first MUMS/STI/characteristics and the second MI/MS/STI/characteristics may be time synchronized.

The following numbered clauses provide examples for correlation-based wireless monitoring and localization.

Clause 1. A method/device/system/software of a correlation-based wireless monitoring system, comprising: determining a plurality of Type 1 or Type2 heterogeneous wireless devices in a venue forming at least two Type 1-Type2 device pairs, each Type 1-Type2 device pair comprising a Type 1 heterogeneous wireless device (TX) and a Type2 heterogeneous wireless device (RX); determining a number of objects each undergoing a respective motion in the venue; for each Type 1-Type2 device pair: transmitting a respective wireless signal by the Type1 device of the pair, receiving the respective wireless signal by the Type2 device of the pair through a respective wireless multipath channel of the venue, wherein the received wireless signal differs from the transmitted wireless signal due to the wireless multipath channel and the motion of the number of objects in the venue, obtaining a respective time series of channel information (TSCI) based on the received wireless signal, computing a respective motion information (MI) based on the TSCI, and performing a respective sensing task based on the respective MI and the respective TSCI; detecting and monitoring motion of a first object in a first sensing task based on a first MI computed based on a first TSCI associated with a first Type1-Type2 device pair; detecting and monitoring motion of a second object in a second sensing task based on a second MI computed based on a second TSCI associated with a second Type1-Type2 device pair; computing a correlation score between the first MI and the second MI based on the first TSCI, the second TSCI, the first MI and the second MI; detecting the first object and the second object as a same object when the correlation score is greater than a first threshold; detecting the first object and the second object as two separate objects when the correlation score is less than a second threshold.

Clause 2. The method/device/system/software of the correlation-based wireless monitoring system of clause 1, comprising: aligning the first MI and the second MI in the time domain; computing the correlation score between the aligned first MI and the aligned second MI.

Clause 3. The method/device/system/software of the correlation-based wireless monitoring system of clause 2, comprising: computing a time series of first MI based on the first TSCI, each first MI computed based on a respective first sliding window of the first TSCI; computing a time series of second MI based on the second TSCI, each second MI computed based on a respective second sliding window of the second TSCI; computing the correlation score between the time series of first MI and the time series of second MI.

Clause 4. The method/device/system/software of the correlation-based wireless monitoring system of clause 3, comprising: computing the correlation score between a time window of the time series of first MI and the same time window of the time series of second MI.

Clause 5. The method/device/system/software of the correlation-based wireless monitoring system of clause 4, comprising: determining that there are N1 of the first MI in the time window of the time series of first MI and N2 of the second MI in the time window of the time series of second MI; resampling the time series of first MI to generate N3 aligned first MI in the time window; resampling the time series of second MI to generate N3 aligned second MI in the time window, each of the N3 aligned second MI is time aligned with a respective one of the N3 aligned MI; computing the correlation score based on the N3 aligned first MI and the N3 aligned second MI in the time window.

Clause 6. The method/device/system/software of the correlation-based wireless monitoring system of clause 1, comprising: wherein a MI computed based on a TSCI comprises at least one of: an average within a sliding time window, a magnitude of each CI in the sliding time window, a magnitude square of each component of each CI in the sliding time window, a correlation between two temporally adjacent CI of the TSCI, a similarity score between two temporally adjacent CI of the TSCI, an inner product of two vectors of temporally adjacent CI of the TSCI, an average of component-wise correlation between components of two temporally adjacent CI of the TSCI, a weighted average of a number of largest component-wise correlation.

Clause 7. The method/device/system/software of the correlation-based wireless monitoring system of clause 1, comprising: wherein the correlation score between the first MI and the second MI comprises at least one of: correlation, correlation coefficient, absolute value of correlation, a monotonic function of the correlation, between the two MI.

Clause 8. The method/device/system/software of the correlation-based wireless monitoring system of clause 1, comprising: wherein the first sensing task and the second sensing task are different.

Clause 9. The method/device/system/software of the correlation-based wireless monitoring system of clause 8, comprising: wherein both the first MI and the second MI are similar mathematically or statistically.

Clause 10. The method/device/system/software of the correlation-based wireless monitoring system of clause 9, comprising: wherein the first sensing task and the second sensing task comprise a common subtask; wherein both the first MI and the second MI are similar mathematically or statistically and are used to perform the common subtask.

Clause 11. The method/device/system/software of the correlation-based wireless monitoring system of clause 10, comprising: wherein the common subtask comprises motion detection.

Clause 12. The method/device/system/software of the correlation-based wireless monitoring system of clause 1, comprising: detecting the first object and the second object as a first common object because the correlation score is greater than the first threshold; computing a first representative MI associated with the first common object representing the first object and the second object based on the first MI and the second MI; detecting and monitoring motion of a third object in a third sensing task based on a third MI computed based on a third TSCI associated with a third Type 1-Type2 device pair; computing a second correlation score between the third MI and the first representative MI based on the first TSCI, the second TSCI, the third TSCI, the first representative MI and the third MI; detecting the third object and the first common object as a same object when the second correlation score is greater than the first threshold; detecting the third object and the first common object as two separate objects when the second correlation score is less than the second threshold.

Clause 13. The method/device/system/software of the correlation-based wireless monitoring system of clause 12, comprising: detecting the first object, the second object and the third object as the first common object because the second correlation score is greater than the first threshold; computing a second representative MI associated with the first common object representing the first object, the second object and the third object based on the first MI, the second MI and the third MI; detecting and monitoring motion of a fourth object in a fourth sensing task based on a fourth MI computed based on a fourth TSCI associated with a fourth Type1-Type2 device pair; computing a third correlation score between the fourth MI and the second representative MI based on the first TSCI, the second TSCI, the third TSCI, the fourth TSCI, the second representative MI and the fourth MI; detecting the fourth object and the first common object as a same object when the third correlation score is greater than the first threshold; detecting the fourth object and the first common object as two separate objects when the third correlation score is less than the second threshold.

Clause 14. The method/device/system/software of the correlation-based wireless monitoring system of clause 13, comprising: wherein any representative MI associated with a common object representing multiple objects comprises one of: one of the multiple MI associated with the multiple objects, a sum or a weighted sum or a product or a weighted product of the multiple MI, an arithmetic or geometric or harmonic mean of the multiple MI, a weighted arithmetic or geometric or harmonic mean of the multiple MI, a trimmed mean of the multiple MI, a median or weighted median or a percentile of the multiple MI, a maximum or minimum of the multiple MI, one of the multiple MI associated with the multiple objects with maximum magnitude, one of the multiple MI associated with the multiple objects with maximum average magnitude.

Clause 15. The method/device/system/software of the correlation-based wireless monitoring system of clause 1, comprising: locating the first and second object by associating the first object with a first zone in the venue and the second object with a second zone in the venue when the correlation score is less than the second threshold, wherein the first zone is a neighborhood around: a location of the Type 1 device or a location of the Type2 device of the first Type 1-Type2 device pair, or both, wherein the second zone is a neighborhood around: a location of the Type 1 device of the second pair, or a location of the Type2 device of the second Type 1-Type2 device pair, or both; locating the first and second object by associating the same object of the first object and the second object with a first derived zone related to the first zone and the second zone in the venue when the correlation score is greater than the first threshold, wherein the first derived zone comprises at least one of: an intersection of the first zone and the second zone, or a union of the first zone and the second zone.

Clause 16. The method/device/system/software of the correlation-based wireless monitoring system of clause 12, comprising: associating the third object with a third zone in the venue when the second correlation score is less than the second threshold, wherein the third zone is a neighborhood around: a location of the Type 1 device of the third pair, or a location of the Type2 device of the third Type1-Type2 device pair, or both; associating the same object of the first object, the second object and the third object with a second derived zone related to the first zone, the second zone and the third zone in the venue when the second correlation score is greater than the first threshold, wherein the second derived zone comprises at least one of: an intersection of the first zone and the second zone, an intersection of the first zone and the third zone, an intersection of the second zone and the third zone, an intersection of the first zone, the second zone, and the third zone, or a union of any of: the first zone, the second zone or the third zone.

Clause 17. The method/device/system/software of the correlation-based wireless monitoring system of clause 13, comprising: computing a count of the number of objects by: determining a count of Type1-Type2 device pairs with motion detected and monitored, associating a respective tentative object with each of the Type 1-Type2 device pairs with motion detected and monitored, iteratively merging any two tentative objects when a respective correlation score indicates the two tentative objects are a same object, computing the count of the number of objects as the amount of final distinct tentative objects, locating each object by associating it with a zone in the venue associated with the final distinct tentative object or any intermediate tentative objects being merged to obtain the final distinct tentative object.

Clause 18. The method/device/system/software of the correlation-based wireless monitoring system of clause 1, comprising: wherein each CI comprises at least one of: channel state information (CSI), channel impulse response (CIR) or channel frequency response (CFR).

Clause 19. The method/device/system/software of the correlation-based wireless monitoring system of clause 13, comprising: computing the correlation score between any two MI only if motion is detected in both of the two associated Type 1-Type2 device pairs based on the two MI respectively.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method for correlation-based wireless monitoring, comprising:
   forming, by a plurality of first wireless devices and a plurality of second wireless devices in a venue, at least two device pairs, each device pair comprising a first wireless device and a second wireless device, wherein the venue includes a number of objects each undergoing a respective motion;
   for each device pair:
      transmitting, by the first wireless device of the device pair, a respective wireless signal,
      receiving, by the second wireless device of the device pair, the respective wireless signal through a respective wireless multipath channel of the venue, wherein the received wireless signal differs from the transmitted wireless signal due to the respective wireless multipath channel and the motions of the number of objects in the venue,
      obtaining a respective time series of channel information (TSCI) of the respective wireless multipath channel based on the received wireless signal,
      computing a respective motion information (MI) based on the TSCI, and
      performing a respective sensing task based on the respective MI and the respective TSCI;
   detecting and monitoring motion of a first object in a first sensing task based on a first MI computed based on a first TSCI associated with a first device pair;
   detecting and monitoring motion of a second object in a second sensing task based on a second MI computed based on a second TSCI associated with a second device pair;
   computing a correlation score based at least partially on: the first TSCI, the second TSCI, the first MI and the second MI;
   detecting the first object and the second object as a same object when the correlation score is greater than a first threshold;
   detecting the first object and the second object as two different objects when the correlation score is less than a second threshold;
   locating the first object and the second object by associating the first object with a first zone in the venue and associating the second object with a second zone in the venue, when the correlation score is less than the second threshold, wherein
      the first zone is a neighborhood around: a location of the first wireless device of the first device pair, a location of the second wireless device of the first device pair, or both,
      the second zone is a neighborhood around: a location of the first wireless device of the second device pair, a location of the second wireless device of the second device pair, or both; and
   locating the first object and the second object by associating the same object representing the first object and the second object with a first derived zone related to the first zone and the second zone in the venue, when the correlation score is greater than the first threshold, wherein the first derived zone comprises at least one of: an intersection of the first zone and the second zone, or a union of the first zone and the second zone.

2. The method of claim 1, further comprising:
   aligning the first MI and the second MI in the time domain; and
   computing the correlation score between the aligned first MI and the aligned second MI.

3. The method of claim 1, further comprising:
   computing a time series of first MI based on the first TSCI, wherein each first MI is computed based on a respective first sliding window of the first TSCI;
   computing a time series of second MI based on the second TSCI, wherein each second MI is computed based on a respective second sliding window of the second TSCI; and
   computing the correlation score between the time series of first MI and the time series of second MI.

4. The method of claim 1, further comprising:
   computing a time series of first MI based on the first TSCI, wherein each first MI is computed based on a respective first sliding window of the first TSCI;
   computing a time series of second MI based on the second TSCI, wherein each second MI is computed based on a respective second sliding window of the second TSCI; and
   computing the correlation score between a time window of the time series of first MI and the same time window of the time series of second MI.

5. The method of claim 4, wherein:
   determining that the time window covers N1 first MI in the time series of first MI and N2 second MI in the time series of second MI;
   resampling the time series of first MI to generate N3 aligned first MI in the time window;
   resampling the time series of second MI to generate N3 aligned second MI in the time window, wherein each of the N3 aligned second MI is time aligned with a respective one of the N3 aligned first MI; and
   computing the correlation score based on the N3 aligned first MI and the N3 aligned second MI in the time window.

6. The method of claim 1, wherein a MI computed based on a TSCI comprises at least one of:
   an average within a sliding time window;
   a magnitude of each CI in the sliding time window;
   a magnitude square of each component of each CI in the sliding time window;
   a correlation between two temporally adjacent CI of the TSCI;
   a similarity score between two temporally adjacent CI of the TSCI;
   an inner product of two vectors of temporally adjacent CI of the TSCI;
   an average of component-wise correlation between components of two temporally adjacent CI of the TSCI; or
   a weighted average of a number of largest component-wise correlation.

7. The method of claim 1, wherein the correlation score is computed based on at least one of: correlation, correlation coefficient, absolute value of correlation, or a monotonic function of the absolute value of correlation, between the first MI and the second MI.

8. The method of claim 1, wherein the first sensing task and the second sensing task are different.

9. The method of claim 1, wherein the first MI and the second MI are the same mathematically or statistically.

10. The method of claim 9, wherein:
the first sensing task and the second sensing task comprise a common subtask; and
both the first MI and the second MI are used to perform the common subtask.

11. The method of claim 10, wherein:
the common subtask comprises motion detection.

12. The method of claim 1, further comprising:
determining that the correlation score is greater than the first threshold;
detecting the first object and the second object as a first common object because the correlation score is greater than the first threshold;
computing a first representative MI associated with the first common object representing the first object and the second object based on the first MI and the second MI;
detecting and monitoring motion of a third object in a third sensing task based on a third MI computed based on a third TSCI associated with a third device pair;
computing a second correlation score between the third MI and the first representative MI based on: the first TSCI, the second TSCI, the third TSCI, the first representative MI and the third MI;
detecting the third object and the first common object as a same object when the second correlation score is greater than the first threshold; and
detecting the third object and the first common object as two different objects when the second correlation score is less than the second threshold.

13. The method of claim 12, further comprising:
determining that the second correlation score is greater than the first threshold;
detecting the first object, the second object and the third object as the first common object because the second correlation score is greater than the first threshold;
computing a second representative MI associated with the first common object representing the first object, the second object and the third object based on the first MI, the second MI and the third MI;
detecting and monitoring motion of a fourth object in a fourth sensing task based on a fourth MI computed based on a fourth TSCI associated with a fourth device pair;
computing a third correlation score between the fourth MI and the second representative MI based on the first TSCI, the second TSCI, the third TSCI, the fourth TSCI, the second representative MI and the fourth MI;
detecting the fourth object and the first common object as a same object when the third correlation score is greater than the first threshold; and
detecting the fourth object and the first common object as two different objects when the third correlation score is less than the second threshold.

14. The method of claim 13, wherein a representative MI associated with a common object representing multiple objects comprises one of:
one of multiple MI associated with the multiple objects,
a sum or a weighted sum or a product or a weighted product of the multiple MI,
an arithmetic or geometric or harmonic mean of the multiple MI,
a weighted arithmetic or geometric or harmonic mean of the multiple MI,
a trimmed mean of the multiple MI,
a median or weighted median or a percentile of the multiple MI,
a maximum or minimum of the multiple MI,
one of the multiple MI having a maximum magnitude, or
one of the multiple MI having a maximum average magnitude.

15. The method of claim 12, further comprising:
associating the third object with a third zone in the venue when the second correlation score is less than the second threshold, wherein the third zone is a neighborhood around: a location of the first wireless device of the third device pair, a location of the second wireless device of the third device pair, or both;
associating the same object representing the first object, the second object and the third object with a second derived zone related to the first zone, the second zone and the third zone in the venue, when the second correlation score is greater than the first threshold,
wherein the second derived zone comprises at least one of:
an intersection of the first zone and the second zone,
an intersection of the first zone and the third zone,
an intersection of the second zone and the third zone,
an intersection of the first zone, the second zone, and the third zone, or
a union of at least two of: the first zone, the second zone and the third zone;
wherein the first zone is a neighborhood around: a location of the first wireless device of the first device pair, a location of the second wireless device of the first device pair, or both;
wherein the second zone is a neighborhood around: a location of the first wireless device of the second device pair, a location of the second wireless device of the second device pair, or both.

16. The method of claim 15, further comprising computing a quantity of the number of objects based on:
determining a number of device pairs having motion detected and monitored in the venue;
associating a respective tentative object with each of the number of device pairs;
iteratively merging any two tentative objects when a respective correlation score indicates the two tentative objects are a same object, to identify at least one final distinct object;
computing the quantity of the number of objects as a total quantity of the at least one final distinct object; and
locating each of the at least one final distinct object by associating it with a zone in the venue, wherein the zone is associated with a location of the final distinct object or with locations of any tentative object merged to obtain the final distinct object.

17. The method of claim 16, wherein:
each correlation score is between two MI associated with two device pairs respectively, and is computed only if motion is detected in both of the two device pairs based on the two MI respectively.

18. The method of claim 1, wherein each CI comprises at least one of: channel state information (CSI), channel impulse response (CIR) or channel frequency response (CFR).

19. A system for correlation-based wireless monitoring, comprising:
- at least two device pairs in a venue, each device pair comprising a first wireless device and a second wireless device, wherein the venue includes a number of objects each undergoing a respective motion, wherein for each device pair:
  - the first wireless device of the device pair is configured to transmit a respective wireless signal, and
  - the second wireless device of the device pair is configured to:
    - receive the respective wireless signal through a respective wireless multipath channel of the venue, wherein the received wireless signal differs from the transmitted wireless signal due to the respective wireless multipath channel and motions of a number of objects in the venue,
    - obtain a respective time series of channel information (TSCI) of the respective wireless multipath channel based on the received wireless signal,
    - compute a respective motion information (MI) based on the TSCI, and
    - perform a respective sensing task based on the respective MI and the respective TSCI; and
- a processor configured for:
  - computing a correlation score based at least partially on: a first TSCI, a second TSCI, a first MI and a second MI,
  - wherein motion of a first object is detected and monitored in a first sensing task based on the first MI computed based on the first TSCI associated with a first device pair,
  - wherein motion of a second object is detected and monitored in a second sensing task based on the second MI computed based on the second TSCI associated with a second device pair,
  - detecting the first object and the second object as a same object when the correlation score is greater than a first threshold,
  - detecting the first object and the second object as two different objects when the correlation score is less than a second threshold,
  - locating the first object and the second object by associating the first object with a first zone in the venue and associating the second object with a second zone in the venue, when the correlation score is less than the second threshold, wherein
    - the first zone is a neighborhood around: a location of the first wireless device of the first device pair, a location of the second wireless device of the first device pair, or both,
    - the second zone is a neighborhood around: a location of the first wireless device of the second device pair, a location of the second wireless device of the second device pair, or both, and
  - locating the first object and the second object by associating the same object representing the first object and the second object with a first derived zone related to the first zone and the second zone in the venue, when the correlation score is greater than the first threshold, wherein the first derived zone comprises at least one of: an intersection of the first zone and the second zone, or a union of the first zone and the second zone.

20. An apparatus for correlation-based wireless monitoring, comprising:
- a memory having a set of instructions stored therein; and
- a processor communicatively coupled with the memory and configured for:
  - computing a correlation score based at least partially on: a first time series of channel information (TSCI), a second TSCI, a first motion information (MI) and a second MI,
  - wherein motion of a first object is detected and monitored in a first sensing task associated with a first device pair based on the first MI computed based on the first TSCI obtained from a first wireless signal communicated between the first device pair in a venue, wherein the venue includes a number of objects each undergoing a respective motion,
  - wherein motion of a second object is detected and monitored in a second sensing task associated with a second device pair based on the second MI computed based on the second TSCI obtained from a second wireless signal communicated between the second device pair in the venue, wherein each device pair comprises a first wireless device and a second wireless device, wherein for each device pair:
    - the first wireless device of the device pair is configured to transmit a respective wireless signal, and
    - the second wireless device of the device pair is configured to:
      - receive the respective wireless signal through a respective wireless multipath channel of the venue, wherein the received wireless signal differs from the transmitted wireless signal due to the respective wireless multipath channel and the motions of the number of objects in the venue,
      - obtain a respective TSCI of the respective wireless multipath channel based on the received wireless signal,
      - compute a respective MI based on the TSCI, and
      - perform a respective sensing task based on the respective MI and the respective TSCI; and
  - detecting the first object and the second object as a same object when the correlation score is greater than a first threshold,
  - detecting the first object and the second object as two different objects when the correlation score is less than a second threshold,
  - locating the first object and the second object by associating the first object with a first zone in the venue and associating the second object with a second zone in the venue, when the correlation score is less than the second threshold, wherein
    - the first zone is a neighborhood around: a location of the first wireless device of the first device pair, a location of the second wireless device of the first device pair, or both,
    - the second zone is a neighborhood around: a location of the first wireless device of the second device pair, a location of the second wireless device of the second device pair, or both, and
  - locating the first object and the second object by associating the same object representing the first object and the second object with a first derived zone related to the first zone and the second zone in the venue, when the correlation score is greater than the first threshold, wherein the first derived zone comprises at least one of: an intersection of the first zone and the second zone, or a union of the first zone and the second zone.

* * * * *